(12) United States Patent
Haimer et al.

(10) Patent No.: US 9,878,376 B2
(45) Date of Patent: Jan. 30, 2018

(54) CLAMPING SYSTEM AND BASE, COLLET CHUCK AND ROTARY TOOL THEREFOR AND METHOD FOR MOUNTING THE ROTARY TOOL IN THE CLAMPING SYSTEM

(75) Inventors: Franz Haimer, Hollenbach/Igenhausen (DE); Wolfgang Kügle, Aichach-Griesbekerzell (DE)

(73) Assignee: Haimer GmbH, Igenhausen (DE)

( * ) Notice: Subject to any disclaimer, the term of this patent is extended or adjusted under 35 U.S.C. 154(b) by 311 days.

(21) Appl. No.: 14/343,973

(22) PCT Filed: Aug. 29, 2012

(86) PCT No.: PCT/EP2012/003630
§ 371 (c)(1),
(2), (4) Date: Mar. 10, 2014

(87) PCT Pub. No.: WO2013/037458
PCT Pub. Date: Mar. 21, 2013

(65) Prior Publication Data
US 2014/0227057 A1    Aug. 14, 2014

(30) Foreign Application Priority Data
Sep. 15, 2011    (DE) .................. 10 2011 113 494

(51) Int. Cl.
*B23B 31/20*    (2006.01)
*B23B 31/117*    (2006.01)
(Continued)

(52) U.S. Cl.
CPC ............ *B23B 31/20* (2013.01); *B23B 31/008* (2013.01); *B23B 31/02* (2013.01);
(Continued)

(58) Field of Classification Search
CPC ............ B23B 2240/28; B23B 2240/32; B23B 31/008; B23B 31/1074; B23B 31/117;
(Continued)

(56) References Cited

U.S. PATENT DOCUMENTS

| 386,185 | A | * | 7/1888 | Crabbs | .................... B23B 31/20 |
| | | | | | 279/49 |
| 1,369,632 | A | * | 2/1921 | Diel | ...................... B23B 31/202 |
| | | | | | 279/49 |

(Continued)

FOREIGN PATENT DOCUMENTS

| CH | 550042 A | * 6/1974 | .......... B23B 31/202 |
| CN | 1392814 | 1/2003 | |

(Continued)

OTHER PUBLICATIONS

EP 2292358; Harald Fiedler; Device for a Holder with a Cutting Tool; EPO English Machine Translation, Nov. 28, 2015; pp. 1-7.*

(Continued)

*Primary Examiner* — Eric A Gates
*Assistant Examiner* — Chwen-Wei Su
(74) *Attorney, Agent, or Firm* — Briggs and Morgan, P.A.; Gerald E. Helget

(57) ABSTRACT

The invention provides a clamping system (1) for a rotary tool (70), for example a milling cutter or drill. The clamping system (1) includes a base element (10), a collet (30) and a clamping nut (50), said clamping nut (50) friction-locking the rotary tool (70) within the base element (10) with the collet (30). In order to avoid a relative rotation of the base element (10) and the collet (30), the clamping system (1) has a form locking anti-twist protection which blocks a rotation of the collet (30) relative to the base element (10).

4 Claims, 31 Drawing Sheets

(51) Int. Cl.
 *B23B 31/00* (2006.01)
 *B23B 31/02* (2006.01)
(52) U.S. Cl.
 CPC ........ *B23B 31/1179* (2013.01); *B23B 31/201* (2013.01); *B23B 31/208* (2013.01); *B23B 2231/022* (2013.01); *B23B 2231/024* (2013.01); *B23B 2231/026* (2013.01); *B23B 2231/0224* (2013.01); *B23B 2231/0228* (2013.01); *B23B 2231/0232* (2013.01); *B23B 2231/04* (2013.01); *B23B 2231/2005* (2013.01); *B23B 2231/2016* (2013.01); *B23B 2231/2032* (2013.01); *B23B 2231/2035* (2013.01); *B23B 2231/2037* (2013.01); *B23B 2231/2091* (2013.01); *B23B 2240/04* (2013.01); *B23B 2260/026* (2013.01); *B23B 2260/112* (2013.01); *B23B 2265/12* (2013.01); *Y10T 29/49826* (2015.01); *Y10T 279/17418* (2015.01); *Y10T 279/17923* (2015.01); *Y10T 409/30952* (2015.01)

(58) Field of Classification Search
 CPC . B23B 31/1175; B23B 31/1179; B23B 31/20; B23B 31/202; B23B 2231/08; B23B 2231/028; B23B 2231/2005; B23B 2231/2008; B23B 2231/2016; B23B 2231/46; B23B 2231/48; B23B 2231/0224; B23B 2231/2032; B23B 2231/026; B23B 2231/2013; B23B 2231/2035; Y10T 279/17316; Y10T 279/17923; Y10T 279/17957; Y10T 279/17761
 See application file for complete search history.

(56) References Cited

U.S. PATENT DOCUMENTS

| | | | | |
|---|---|---|---|---|
| 2,270,661 | A * | 1/1942 | Montgomery | B23B 31/202 279/51 |
| 3,313,186 | A * | 4/1967 | Rochon | B23B 51/06 29/241 |
| 3,332,693 | A * | 7/1967 | Armstrong | B23B 31/20 279/155 |
| 3,830,135 | A * | 8/1974 | Sullivan | B23B 31/202 279/53 |
| 4,497,498 | A * | 2/1985 | Buck | B23B 31/202 242/573 |
| 4,795,175 | A * | 1/1989 | Babb | B23B 31/023 269/163 |
| 5,938,212 | A | 8/1999 | Wadsworth | |
| 6,339,868 | B1 | 1/2002 | Nagaya et al. | |
| 2002/0180165 | A1 | 12/2002 | Retzbach et al. | |
| 2003/0047889 | A1* | 3/2003 | Gerber | B23B 31/201 279/49 |
| 2004/0021276 | A1* | 2/2004 | Allan | B23B 31/1173 279/103 |
| 2009/0179368 | A1 | 7/2009 | Haimer | |
| 2009/0273145 | A1* | 11/2009 | Retzbach | B23B 31/117 279/28 |

FOREIGN PATENT DOCUMENTS

| | | | |
|---|---|---|---|
| CN | 101066563 | 11/2007 | |
| CN | 200977561 | 11/2007 | |
| CN | 101432088 | 5/2009 | |
| DE | 2743503 | 4/1978 | |
| DE | 3233868 | 3/1984 | |
| DE | 8717516 | 3/1989 | |
| DE | 4115992 | 11/1992 | |
| DE | 4222809 | 1/1993 | |
| DE | 19512556 | 10/1996 | |
| DE | 19832793 | 3/1999 | |
| DE | 102006028408 | 10/2007 | |
| DE | 102008041700 | 3/2010 | |
| EP | 1004378 | 5/2000 | |
| EP | 2292358 | 3/2011 | |
| EP | 2292358 A2 * | 3/2011 | ........... B23B 29/046 |
| FR | 2862896 | 6/2005 | |
| JP | S5069389 | 6/1975 | |
| JP | 2002166310 | 6/2002 | |
| JP | 2005536368 | 12/2005 | |
| JP | 2009131930 | 6/2009 | |
| JP | 2009533234 | 9/2009 | |
| WO | 0226429 | 4/2002 | |
| WO | 03006195 | 1/2003 | |
| WO | 2008049621 | 5/2008 | |
| WO | 2010023412 | 3/2010 | |

OTHER PUBLICATIONS

Machine translation, German paten document, DE 415992, Wozar, J.A., Nov. 1992.*
Timchenko et al., RK-3 Profile Joints in Flexible Modular Tooling Systems, Russian Engineering Research, vol. 16, No. 10, Jan. 1, 1996, pp. 54-62.
International Search Report and Written Opinion for PCT/EP2012/003630 dated Feb. 11, 2013.

* cited by examiner

CLAMPING SYSTEM AND BASE, COLLET CHUCK AND ROTARY TOOL THEREFOR AND METHOD FOR MOUNTING THE ROTARY TOOL IN THE CLAMPING SYSTEM

CROSS-REFERENCE TO RELATED APPLICATIONS

The present invention is a national phase application of PCT/EP2012/003630 which was filed on Aug. 29, 2012 which claims priority to German Patent Application No. 10 2011 113 494.1, filed Sep. 15, 2011.

BACKGROUND OF THE INVENTION

The present invention relates to a clamping system, a collet, a base element, a reduction sleeve and a rotating tool The present invention furthermore relates to an installation method for a clamping system.

It is known to support rotating tools like for example drills and in particular milling tools in a clamping device of a machine tool. Such clamping devices include a base element with a coupling side end for reception in a machine tool. Furthermore the base element includes a tool side end with a receiving bore hole that is concentric to a rotation axis of the rotating tool. In this receiving bore hole a shaft of the rotating tool is insertable in axial direction starting from a forward face of the tool side end of the base element.

A collet is arranged axially moveable in the receiving bore hole of the base element, wherein the collet envelops the shaft of the rotating tool. This collet preferably has a conical shape which tapers in a direction towards the coupling side end of the base element. The collet is supported at an equally tapering conical section of the radial inner surface of the receiving bore hole of the base element.

In order to attach the collet and the shaft of the rotating tool arranged therein the clamping nut axially forces the collet into the receiving bore hole of the base element in a direction of the coupling side and of the base element. When tightening the clamping nut the collet is pressed into the conical receiving bore hole of the base element so that the inner diameter of the collet is reduced and the collet is radially clamped in the receiving bore hole of the base element. Thus, the collet as well as the shaft of the rotating tool is supported in the base element in a friction locking manner.

According to another known embodiment of a clamping system the collet is a shrink fit collet which is clamped in the base element or in the chuck. In a system of this type in which the shrink fit collet is fixated in the base element through shrinking no additional clamping nut is required. Alternatively a shrink fit collet can also be interpreted as a collet which is shrunk with the tool to form an integral unit together with the rotating tool. According to another alternative clamping system the rotating tool is clamped directly in the base element or chuck and thus fixated. Respective embodiments are a shrink fit chuck and a hydro expansion chuck. In these clamping systems that include a base element or a chuck and a rotating tool neither a collet nor a clamping nut is required for attaching the rotating tool.

Due to its configurative cooperation the combination of the base element, collet and clamping nut is also designated as clamping system. A clamping system of this type is described for example in WO 2008/049 621 A2.

In the field of tool holders with clamping system for rotating tools in particular in the field of heavy duty chip removal over and over again there are problems with respect to strength of the clamping system. Heavy duty chip removal causes high forces and torques which are transferred by the rotating tool for example a cutter or drill bit through the collet supporting the rotating tool to the base element or the chuck. During heavy duty chip removal it can occur that the prevailing forces and/or torques exceed the retaining force between collet and base element. In this case the collet starts turning or slipping in the base element. This stops operations which causes undesirable production interruptions since the rotating tool has to be newly clamped. However it is also possible that the base element, the collet, the tool, the rotation machine and/or the work piece to be machined are damaged or even destroyed due to the occurring chipping forces.

Thus, it is a technical problem of the present invention to provide a clamping system for a rotating tool which reliably fixates the rotating tool and/or the collet in the base element also during heavy duty chipping operations so that the disadvantages known in the prior art are avoided.

SUMMARY OF THE INVENTION

The problem recited supra is solved by a clamping system, a collet, a base element, a rotating tool, a reduction sleeve and an installation method for a clamping system. Advantageous improvements and embodiments of the invention can be derived from the appended claims, the subsequent description and the accompanying drawings.

The clamping system according to the invention for a rotating tool with a longitudinal axis and/or a rotation axis includes a base element, in particular a chuck for turning, milling or other rotating machines and similar with a receiving bore hole, a collet which is removably arranged in the receiving bore hole of the base element and a tool receiving bore hole for the rotating tool (70) and a clamping nut which is attachable at the base element in the portion of the receiving bore hole. The collet can be clamped within the base element for providing friction locking torque transfer using a clamping nut. According to the invention press collets are being used which can be clamped in the base element or in the chuck without a clamping nut as an alternative to a collet in combination with a clamping nut. Press collets of this type are pressed into the base element or the chuck with or without heating in order to clamp the rotating tool within the base element or the chuck. It is also feasible to press collets of this type into a receiver bore hole of the base element or the chuck through force transmitting devices. Irrespective of the engineering solution selected for clamping the clamping chuck in the base element and thus for attaching the rotating tool in the clamping system a friction locking connection is provided between the base element and the rotating tool in order to be able to transmit the forces required for machining a work piece. In the subsequent description the term press collet designates a sub group of the super ordinate group of collets whose elements do not require a clamping nut for clamping or attaching in the base element or the chuck.

In order to block a rotation of the collets or press collets according to the alternatives described supra relative to the base element the clamping system includes at least a first rotation safety. This first rotation safety blocks a relative movement in addition to the friction locking connection between the base element and the collet, in particular a rotation of the collet within the base element or about a longitudinal axis of the collet. Thus, the first rotation safety provides an engineered configuration supporting the stability and fixed connection of the clamping system for example to provide integrity of the clamping system during heavy duty chip removal. Preferably the receiving bore hole is arranged in the base element concentric to the rotation axis. However, there are also other applications of the invention in which the receiving bore hole is eccentrically provided in the base element. While the tool receiving bore hole is centrally arranged in the clamping chuck a concentric or eccentric arrangement of the tool receiving bore hole and thus of the rotating tool with reference to a longitudinal axis of the base element is caused by the alternative arrangement of the receiving bore hole in the base element.

The clamping system according to the invention includes a second rotation safety as an alternative or a supplement to the first rotation safety, wherein the second rotation safety blocks a rotation of the rotating tool relative to the collet. The second rotation safety is implemented from an engineering point of view in that a radial outer contour of the rotating tool is adaptable to a polyhedral or substantially polyhedral radial inner contour of the tool receiving bore hole of the collet so that a form locking connection between the collet and the rotating tool is provided after inserting the rotating tool in the tool receiving bore hole. In this context it is preferred that a tool shaft of the rotating tool is adapted in its external shape to a polyhedral or substantially polyhedral radial inner contour of the tool receiving bore hole.

In order to provide the second rotation safety between collet with clamping nut and rotating tool or between press collet without clamping nut and rotating tool the rotating tool preferably has a polyhedral shape or a substantially polyhedral shape in a portion of the tool shaft. Accordingly the cross section surface of the tool shaft is configured polygonal or substantially polygonal. In a polyhedron plural surfaces are connected with one another through edges enclosed between the surfaces. The surfaces of the polyhedron are configured flat whereas the corners are configured with edges. The polyhedron has a polygonal cross section. According to the present invention it is also preferred to use a substantially polyhedral shape in the components of the clamping system and therefore also in the tool shaft, in the receiving bore hole of the base element, in the outer shape of the collet or the press collet and in the tool receiver bore hole. A substantially polyhedral shape includes plural cambered surfaces or a mix of cambered and flat surfaces. The surfaces enclose rounded and/or angled edges so that a shape is provided that is similar to a polyhedron. A cross section of this shape that is substantially polyhedral is configured similar to a polygon. This definition of a polyhedron and of a substantially polyhedral shape by the same token to the first rotation safety and the second rotation safety and the respective components of the clamping system preferred according to the invention as will be described infra.

Preferably the first rotation safety is implemented by a form locking connection between the base element and the collet in a clamping system with or without clamping nut. As another alternative the first rotation safety is implemented in a clamping system with collet and clamping nut through a form locking connection between the collet and the clamping nut. This additional alternative of the first rotation safety is either provided by itself or in combination with the form locking connection between the base element and the collet in the clamping system with the clamping nut.

This form locking connection configured as first rotation safety is configured so that a relative rotation between base element and collet about the longitudinal axis at least of the collet or the press collet, advantageously of both elements, is blocked. It is furthermore advantageous to implement the first rotation safety or the first form locking connection through elements that engage one another and have different shapes and that are arranged differently. In this context it is for example preferred to configure these engaging elements of the form locking connection at opposite radial enveloping surfaces of collet, press collet and base element. It is another alternative to provide these form locking elements at the face of the collet oriented towards the coupling end of the base element and a corresponding opposite portion of the base element. It is another alternative to provide the form locking elements at the face of the collet oriented towards the clamping nut and at a corresponding opposite portion of the clamping nut.

Advantageously the first rotation safety is formed by at least one catch element provided at the collet, the clamping nut and/or the base element or at the press collet and the base element which catch engages a recess in the clamping nut, in the base element and/or in the collet or a recess in the base element and/or in the press collet wherein the recess is complementary to the catch element in order to provide a form locking connection. In this context the catch element is configured in one embodiment as an insertable component which engages a corresponding opening or recess. As a consequence the recess formed at the base element, the clamping nut, the press collet and/or the collet for engagement by the catch elements forms an undercut so that a rotation of the base element and collet and base element and press collet relative to one another about the longitudinal axis of at least the collet or the press collet is blocked. In order to implement the first rotation safety it is therefore of secondary importance which of the elements that interact with one another in a form locking manner are arranged at the base element, at the clamping nut, the collet or the press collet. Furthermore the catch elements can be configured as pins, flat bars, sliders or teeth arranged in recesses in order to only recite a few select embodiments. Accordingly it is preferred to configure the recess receiving the catch element as a bore hole, flat recess similar to a slotted hole or as a radial pocket that is configured partially open. It is furthermore conceivable to implement a teething with recesses that are adjacent to each other or offset from each other and configured as recesses, wherein this teething is complementary to the teething recited supra. Also these are select exemplary embodiments.

In the context of the present invention it is advantageous from an engineering point of view to arrange plural catch elements, advantageously three catch elements symmetrically and/or evenly distributed about the rotation axis of the press collet and evenly offset from one another and to configure them as engagement lugs. Catch elements of this type or engagement lugs are arranged at a face of the collet or press collet which face is oriented towards the base element and the catch elements or engagement lugs extend parallel to the collet or press collet as axially extending catch elements. These axial catch elements engage recesses in the base element that is configured so that they mesh with the catch elements. In order to further increase stability of the clamping system and to reliably mount a rotating tool in the collet or press collet it is also preferred to provide the axial catch elements at a radially inward oriented surface with a profile, advantageously with one or plural circumferentially extending grooves, so that the connection between the collet or the press collet and the rotating tool is supported. It is furthermore a preferred embodiment of the present invention to configure the recesses in the base element for receiving the catch elements of the collet or the press collet in a radially inward direction with respect to the base element.

Thus, the recesses are formed similar to a pocket in order to implement for example a space saving and weight saving arrangement of the clamping system.

According to another preferred embodiment of the present invention the first rotation safety is formed by a radially outer shape of the collet or the press collet that is at least partially polyhedral or substantially polyhedral and a radially inner shape of the receiving bore hole of the base element that is adapted thereto and at least partially polyhedral or substantially polyhedral. With respect to the polyhedron or substantially polyhedral shape the definitions already provided supra apply. The outer shape of the collet or the press collet that is polyhedral or substantially polyhedral and the inner shape of the inner bore hole that is polyhedral or similar to a polyhedron are respectively configured complementary to one another with respect to their contact surfaces. Whereas known collet configurations have used a conical or frustum type outer shape of the collet, the collet is now implemented shaped as a polyhedron or similar to a polyhedron. Complementary to the outer contour of the polyhedron or to the shape that is similar to the polyhedron the receiving bore hole in the base element is formed so that the surfaces of the collet polyhedron or substantially polyhedral shape are supported at the inner surfaces of the polyhedron or substantially polyhedral shape of the base element. Since the edges of the collet polyhedron or substantially polyhedral shape block a rotation within the receiving bore hole of the base element another alternative configuration of the first rotation safety is provided.

According to another preferred embodiment of the present invention the clamping system includes the rotating tool already recited supra including a tool shaft. The tool shaft is attached within the collet or the press collet in the clamping system through friction locking clamping. An axial pull out safety is implemented through an advantageous configuration of collet or press collet and tool shaft between the collet and the rotating tool, so that an axial creeping of the rotating tool in a direction of the longitudinal axis is prevented. Preferably the axial pull out safety and/or rotation safety is provided by a form locking connection between the collet or the press collet and tool shaft of the rotating tool. This optional axial pullout safety of the rotating tool provides additional stabilization of the integrity of the entire clamping system with the rotating tool during operations. This configuration connects the components rotating tool and collet with one another in a more stable manner, whereas the first rotation safety of the clamping system recited supra provides reliable retention of the collet or press collet of the rotating tool within the base element.

Advantageously the axially pull out safety is formed by one or plural catch members arranged distributed over the circumference of the collet or press collet, wherein the catch members engage locking grooves distributed over the circumference of the tool shaft. These locking grooves are variable with respect to their length and shape, however, in order to implement the functionality of the actual pull out safety of the rotating tool the locking grooves are screw shaped, helical or with different curved at least over a portion of their length.

Furthermore an axial pullout safety of this type is implementable through a bayonet type connection between the catch member and the locking groove. In this case the locking groove extends preferably L-shaped so that the longer L-arm extends in a direction of the rotation axis at the tool shaft, whereas the shorter L-arm is arranged in rotation direction of the rotating tool. The pull out safety can be advantageously used also as a rotation safety.

According to another advantageous embodiment of the present invention the catch members are implemented as sliders. Advantageously three sliders are arranged distributed over the circumference of the inner radial enveloping surface of the collet or press collet and supported in the collet or press collet. The sliders form the axial pull out safety of the rotating tool within the collet or press collet through form locking with locking grooves of the tool shaft. In order to implement a reliable attachment of the sliders in recesses of the radially inner enveloping surface of the collet or press collet within the tool receiver bore hole of the collet or press collet advantageously O-rings, retaining rings, snap rings or a corresponding gluing of the slider in the respective recess are being used. Since the sliders are advantageously shape adapted for an optimum engagement in the respective locking grooves of the tool shaft the sliders are also arranged in a position oriented manner according to another embodiment of the present invention in respective recesses of the collet or press collet. Due to the shape of recess and slider it is provided that the respective catch member or slider is insertable and attachable in the respective recess of the collet or press collet advantageously according to a defined orientation. This guarantees optimum cooperation of collet and tool shaft of the rotating tool, the matched shapes of recess and slider prevents an incorrect installation of the slider and thus damages to the rotating tool or an impairment of the function. According to another alternative configuration it is preferred to configure the catch members integrally in one piece with the collet or press collet.

In order to be able to reliably use the rotating tool in the clamping system described supra it is required to install the clamping system and the rotating tool according to an installation method according to the invention. Thus, initially the base element of the clamping system with the receiving bore hole is provided. The collet or press collet according to the invention is inserted into the receiving bore hole of the base element so that the form locking connection between the base element and the collet or press collet is provided which is used as a first rotation safety wherein the form locking connection blocks a rotation of the collet or press collet relative to the base element. In a supplemental manner or as an alternative thereto the rotating tool is inserted in to the collet or press collet so that a form locking connection between the collet or press collet and the rotating tool is established through the radial inner contour of the tool receiving bore hole of the collet or press collet that is shaped polyhedral or substantially polyhedral and the radial outer contour of the rotating tool that is adapted thereto. This form locking connection forms the second rotation safety and blocks a rotation of the rotating tool relative to the collet or press collet and due to the first rotation safety also relative to the base element.

Additionally the shaft of the rotating tool is inserted into the collet or press collet. This step can be performed before or after inserting the collet into the receiver bore hole of the base element. Eventually the rotating tool is attached in the collet through the clamping nut or alternatively thereto in the press collet through other known attachment or clamping methods. The clamping nut is threaded onto an accordingly provided thread at the end of the base element oriented towards the tool and thus presses the collet into the receiving bore hole of the base element. This way the clamping nut simultaneously prevents a disengagement of the form locking connection between the base element and the collet.

The present invention furthermore includes a clamping system for a rotating tool that includes a base element, in particular a chuck for turning milling or other rotating machines and similar with a receiving bore hole for the rotating tool. In the receiving bore hole of the base element a tool shaft of the rotating tool is attachable directly, this means without a collet. The clamping system according to the invention furthermore includes a first rotation safety which locks a relative rotation of the rotating tool relative to the base element in that a radial outer contour of the rotating tool that is polyhedral or substantially polyhedral is adaptable to an inner contour of is the receiving bore hole for the rotating tool that is polyhedral or substantially polyhedral so that a form locking connection between the base element and the rotating tool is provided.

Contrary to the clamping system already recited supra the invention furthermore includes a clamping system that is implemented without a collet chuck. Clamping systems of this type without collet are generally designated in the art as shrink fit chucks or hydro expansion chucks in order to only recite a few embodiments. In another embodiment of these known chucks with direct clamping of the rotating tool in the base element the polyhedral or substantially polyhedral outer shape of the tool shaft of the rotating tool and the polyhedral or substantially polyhedral cross sectional shape of the receiving bore hole of the base element are adapted to one another so that a rotation of the rotating tool relative to the base element about the longitudinal axis of the rotating tool is blocked. Thus, the tool shaft of the rotating tool and the receiving bore hole of the base element form a form locking connection.

In conjunction with all clamping systems according to the invention it is furthermore preferred to insert a reduction sleeve into the combination with the rotating tool. A reduction sleeve of this type is used for adapting a tool shaft of the rotating tool to a oversized tool receiving bore hole of the collet or of the press collet or to an oversized receiving bore hole of the base element. In order not to remove the rotation safety already provided by the invention in spite of using a reduction sleeve the outer radial sleeve shape of the reduction sleeve is adapted to the radial inner wall of the tool receiver of the collet or press collet or the radial inner wall of the receiving bore hole of the base element. Thus, when the radial inner wall of the tool receiving bore hole of the collet or press collet and the radial inner wall of the receiving bore hole of the base element includes a polyhedral or substantially polyhedral shape the radially outer sleeve shape of the reduction sleeve is advantageously configured complementary thereto. In the same way the radially inner sleeve shape of the reduction sleeve is adapted to the radially outer shape of the tool shaft of the rotating tool. In case the tool shaft of the rotating tool has a polyhedral or substantially polyhedral shape the radially inner sleeve shape of the reduction sleeve is advantageously configured complementary thereto. When the tool shaft of the rotating tool on the other hand side is configured with locking grooves or similar, preferably the radially inner sleeve shape is configured circular and provided with catch members which can engage the locking grooves of the tool shaft.

It is furthermore preferred to configure the clamping system according to the invention including the base element and the rotating tool without a collet with an axial pull out safety for the rotating tool as already described supra in a context with the first clamping system according to the invention. The configurative features of the collet described in a context with the axial pull out safety of the first clamping system according to the invention are now provided in the base element with a direct arrangement of the rotating tool in the receiving bore hole of the base element. Thus, the configurative features of the collet are implemented in the same manner in the provided base element.

The present invention furthermore includes an installation method for a rotating tool in the clamping system in that the rotating tool is directly arranged in the base element. This installation method includes the following steps: providing a base element with a polyhedral or substantially polyhedral receiving bore hole for a rotating tool, inserting the rotating tool whose shape is adapted to the receiving bore hole into the receiving bore hole of the base element so that a form locking connection between base element and rotating tool is provided which blocks a rotation of the rotating tool relative to the base element and attaching the rotating tool in the base element.

BRIEF DESCRIPTION OF THE DRAWINGS

The preferred embodiments of the present invention are now described with reference to the accompanying drawing figures, wherein.

DETAILED SPECIFICATION

Figure 1:
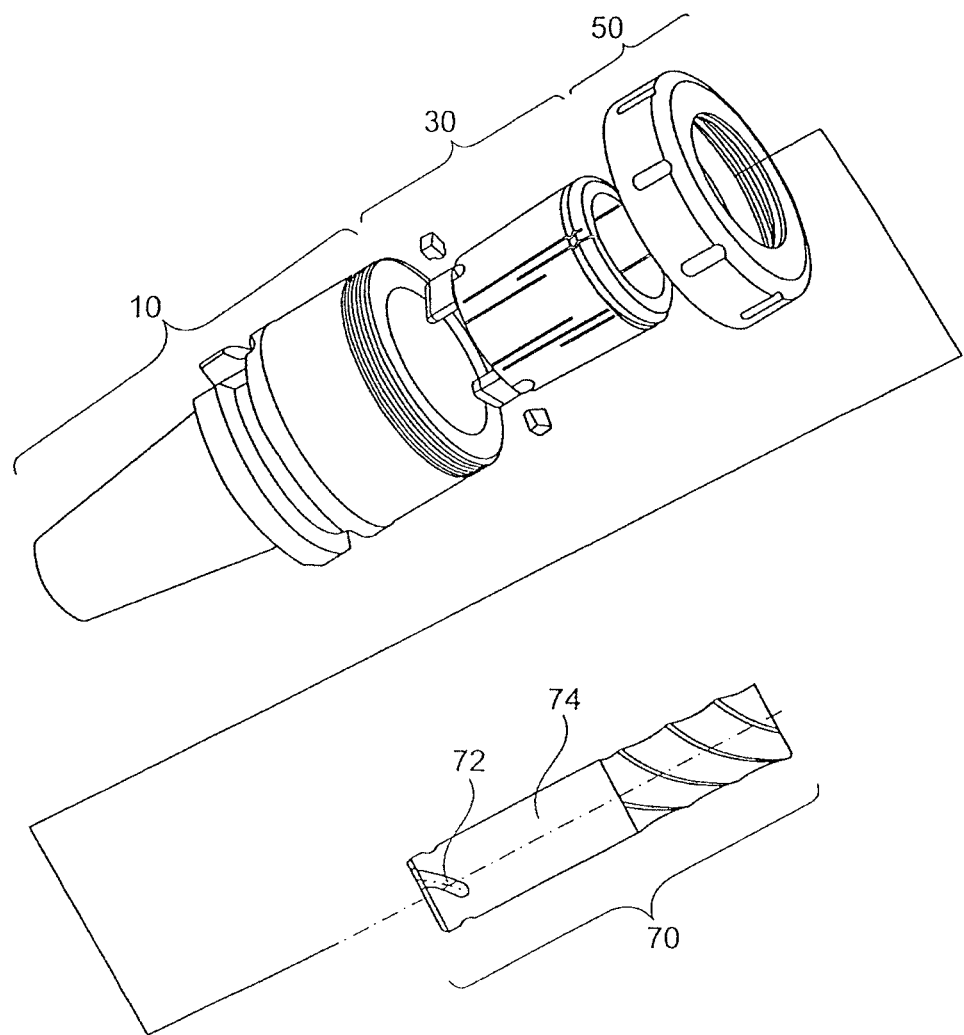
FIG. 1 illustrates a schematic perspective exploded view of a preferred embodiment of the clamping system according to the invention with the rotating tool.
Figure 2:
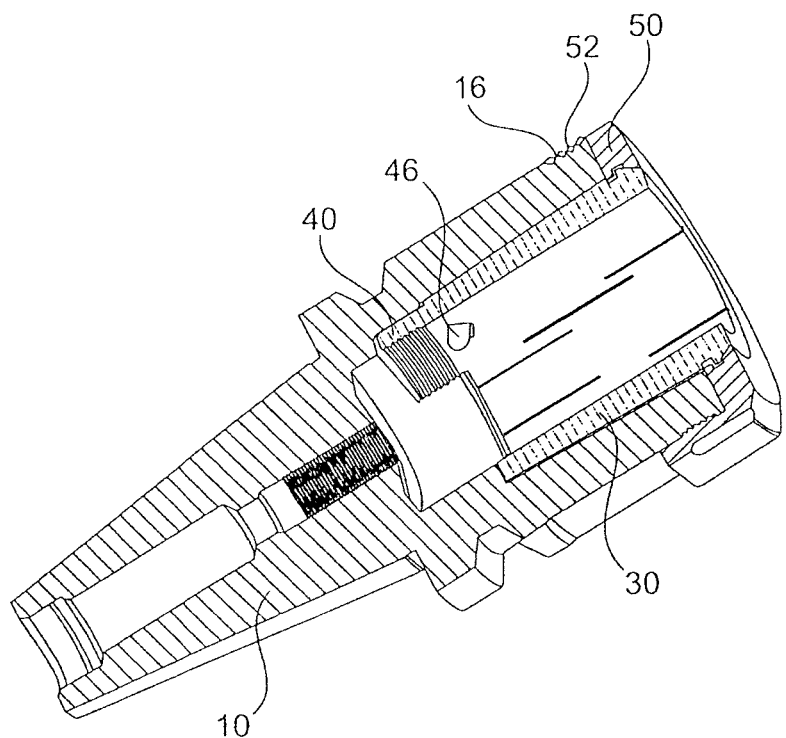
FIG. 2 illustrates a schematic sectional view of another preferred embodiment of the clamping system according to the invention without the rotating tool.
Figure 4:
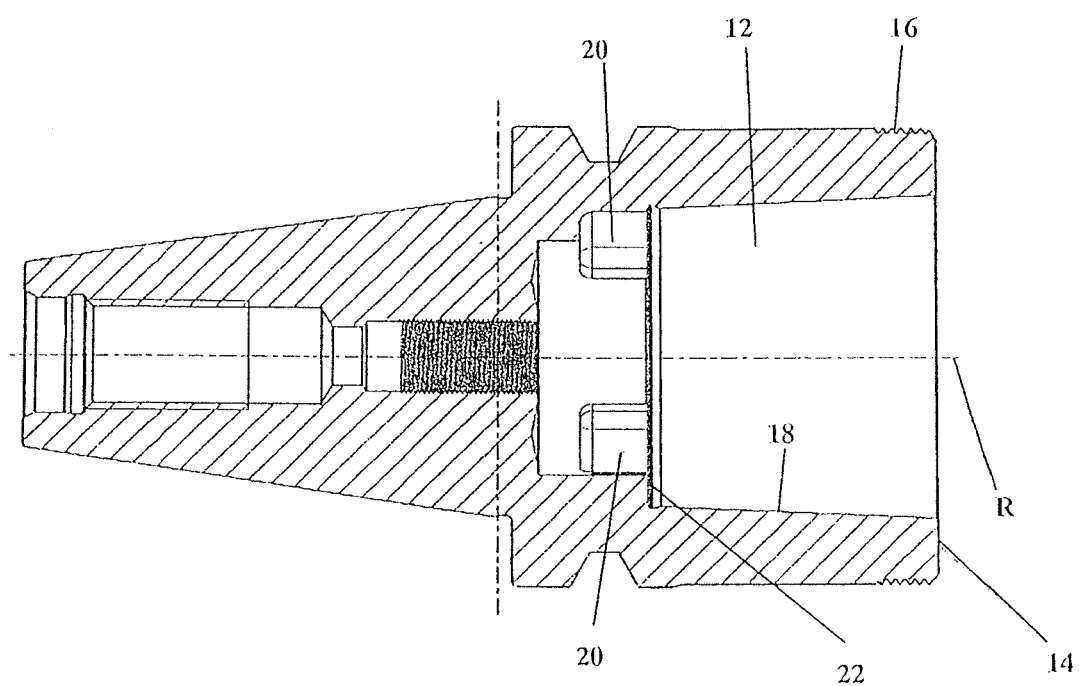
FIG. 4 illustrates a lateral partial sectional view of a preferred embodiment of the base element with a preferred embodiment of the installed collet of the clamping system according to the invention.
Figure 5:
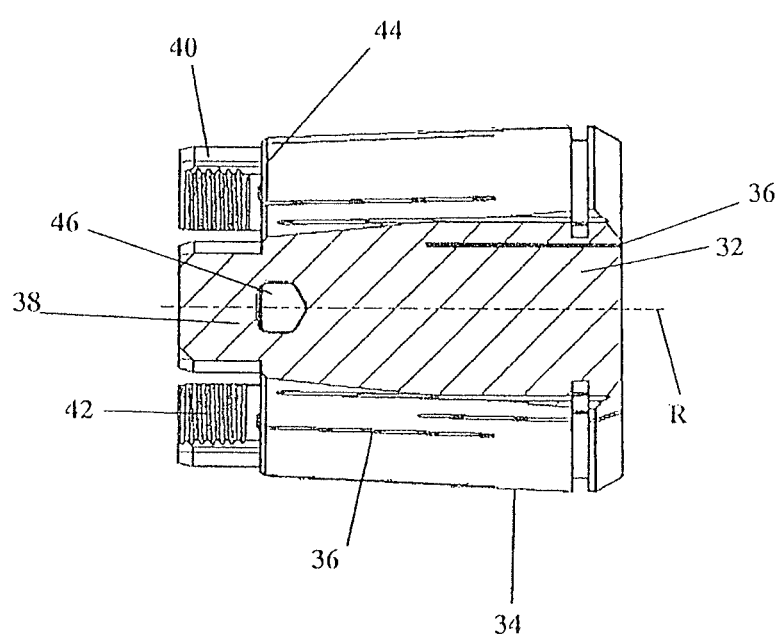
FIG. 5 illustrates a lateral partial sectional view of the collet of FIG. 4.

FIG. 1 illustrates a perspective exploded view of an advantageous embodiment of the clamping system 1 according to the invention. The clamping system 1 includes an advantageous embodiment of a base element 10 which is also illustrated in a lateral sectional view in FIG. 4. In a receiving bore hole 12 which is arranged in this embodiment concentric about a longitudinal axis R of the clamping system 1 a collet 30 is axially insertable from a tool side face 14 of the base element 10. As can be derived from FIG. 1 the illustrated embodiment of the clamping system 1 is arranged rotation symmetrical to the longitudinal axis R. This means that the receiving bore hole 12 of the base element 10 is centrally arranged. Thus the longitudinal axis R of the base element 10, the collet 30, the clamping nut 50 and of the rotating tool 70 is parallel to the rotation axis of the clamping system 1 illustrated in FIG. 1. However, it is also preferred that the receiving bore hole 12 of the base element 10 is not arranged concentric to the rotation axis of the clamping system 1. A configuration of this type is selected when the clamping system 1 attaches a rotating tool 70 but does not rotated itself. It comes as a consequence from these various design alternatives that the reference to the rotation axis R of the clamping system 1 used in the subsequent description also stands in an exemplary manner for a reference to the longitudinal axis of the clamping system 1 and its individual components. The advantageous collet 30 is axially moveable within the receiving bore hole 12 of the base element 10. The collet 30 includes a tool receiving bore hole 32 that is concentric to the rotation axis R as illustrated in the lateral sectional view of the advantageous collet in FIG. 5. Within the tool receiving bore hole 32 a shaft 74 of a rotating tool (c.f. FIG. 1) is receivable, wherein a longitudinal axis of the rotating tool 70 is then arranged parallel to the rotating axis R. Rotating tools that are known in this context are drills, cutters and similar.

In order to attach the rotating tool 70 in the clamping system 1, the collet 30 with the rotating toll 70 is axially pressed into the receiving bore hole 12 of the base element through a clamping device. Advantageously a clamping nut 50 is used as an axial clamping device wherein the clamping nut is threaded through an inner thread 52 at the clamping nut 50 onto a thread 16 on the base element 10 at a tool side end of the base element 10. While the clamping nut 50 is threaded onto the base element 10 the clamping nut 50 forces the collet 30 into the receiving bore hole 12 so that a friction locking connection between the base element 10, the collet 30 and the rotating tool 70 is established. Also other devices can be used as collet clamping devices as they are described for example in DE 157 29 249 C2 and DE 44 05 242 A1.

It is furthermore preferred according to the invention to use a collet 30 in combination with the base element 10 wherein the collet can be pressed into the receiving bore hole 12 of the base element 10 without using a clamping nut 50. Collets 30 of this type are designated in the subsequent description as press collets in order to emphasize the aspect of the lacking clamping nut. Press collets of this type are shrunk for example into the receiving bore hole 12 of the base element 10 in that the base element has been inductive heated before. Such attachments of press collets in the base element 10 without using a clamping nut 50 are generally known in the art. With respect to the advantageous press collet according to the invention it is being emphasized that these press collets have the same configurative properties as the collet described in the application documents as long as the configurative features of the collet 30 do not relate to an interaction with the clamping nut 50. Therefore the press collet is configured with the same configurative association with the base element 10, the rotating tool 70 and a reduction sleeve 60 as it is the case for the collet 30 according to the different embodiments according to the invention.

The collet 30 preferably has a shape that advantageously tapers in a conical manner in the direction of the base element 10, wherein the tapering shape is formed by a radially outer enveloping surface 34. The enveloping surface 34 is supported at an inner enveloping surface 18 of the receiving bore hole 12 of the base element 10, wherein the receiving bore hole 12 is configured complementary to the outer shape of the collet 30. Advantageously the conical shape of the receiving bore hole 12 and of the radially outer enveloping surface 34 has an inclination angle of 8° to 2°, even more preferably less than 3° or between 2° and 2.5° with reference to the rotation axis or longitudinal axis R. These angles of the conical shape are therefore preferred because it is only possible in this angular range that the maximum surface that is available for the clamping effect between the collet and the base element can actually be implemented for the clamping effect. Besides the conical shape of the collet 30 and the receiving bore hole 12 of the base element 10 additional cylindrical sections or other shapes are also conceivable at the collet 30 in order to support a reliable arrangement of the collet 30 in the base element 10.

Figure 12:
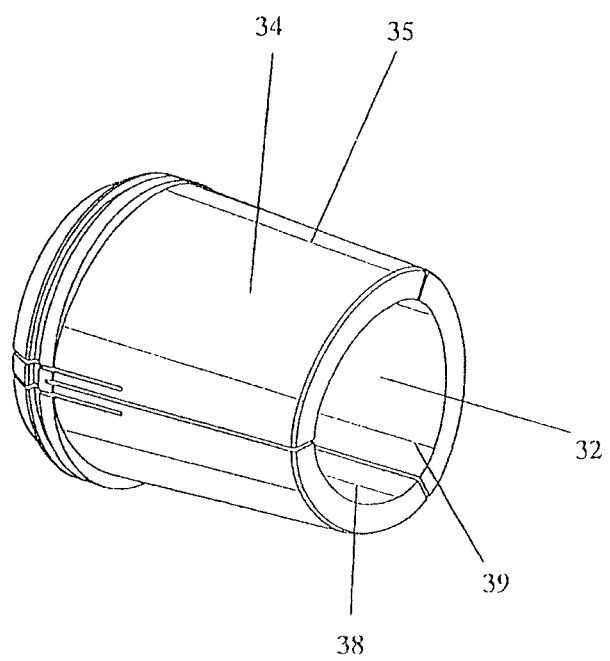
FIG. 12 illustrates a perspective view of another preferred embodiment of a collet with a substantially polyhedral inner and outer contour.
Figure 13:
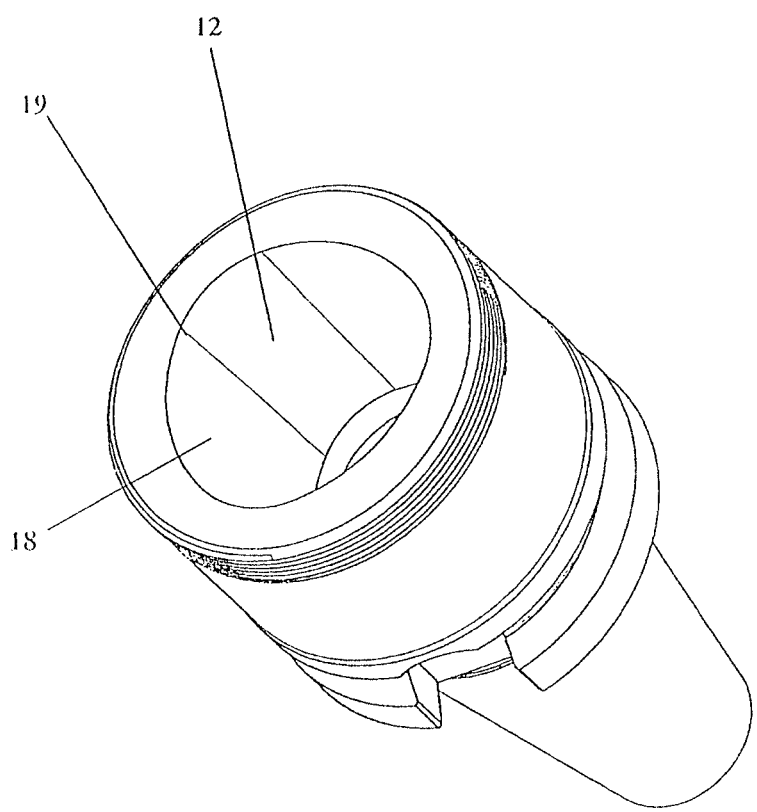
FIG. 13 illustrates a perspective view of a preferred embodiment of the base element with a substantially polyhedral contour of the receiving bore hole.
Figure 14:
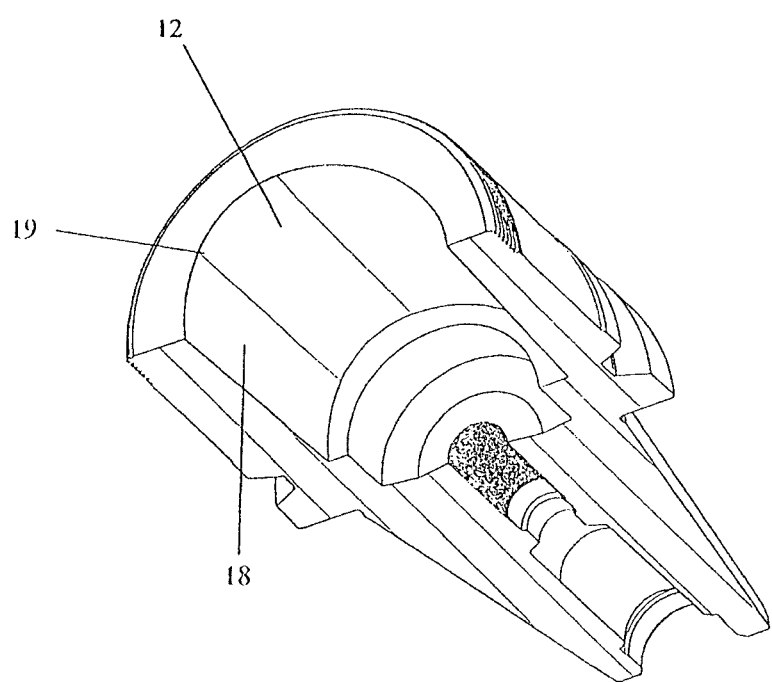
FIG. 14 illustrates a perspective sectional view of the base element of FIG. 13.

According to a preferred configurative embodiment of the present invention the collet 30 tapers in a direction of the base element 10 in a polyhedral (not illustrated) or substantially polyhedral shape. The radially outer enveloping surface 34 is therefore made from plural substantially polyhedral surfaces arranged about the longitudinal axis of the collet 30. Preferably these substantially polyhedral surfaces are cambered and connected with one another through rounded edges 35. A respective embodiment of collets 30 of this type is illustrated in FIG. 12. The illustrated collet 30 has a substantially polyhedral inner surface 32 and outer surface 34. The substantially polyhedral outer contour is inserted into a receiving bore hole 12 of the base element 10 which receiving bore hole is shaped complementary to the outer contour and substantially polyhedral as illustrated in FIGS. 13 and 14. The receiving bore hole 12 of the base element 10 includes respective substantially polyhedral surfaces at the inner enveloping surface 18 which are connected with one another with rounded edges 19.

Thus, the substantially polyhedral shape of the clamping nut 30 and the receiving bore hole 12 of the base element 10 form the first rotation safety.

In analogy to the substantially polyhedral shape each substantially polyhedral shape of the components of the clamping system 1 can also be configured as a polyhedron.

These substantially polyhedral surfaces of the radially outer enveloping surface 34 are supported at the substantially polyhedral inner enveloping surface 18 of the receiving bore hole 12 of the base element 10 that is configured complementary to the radially outer enveloping surface 34. The inner enveloping surface 18 accordingly has substantially polyhedral edges 19 which cooperate with the substantially polyhedral edges 35 of the collet 30. Thus, also according to this configurative alternative the receiving bore hole 12 is configured complementary to the outer shape of the collet 30. Furthermore the same rules apply for the angular arrangement of the substantially polyhedral surfaces as described supra in conjunction with the conical shape of the collet. Using the collet 30 in a substantially polyhedral shape implements a form locking connection between the collet 30 and the base element 10 after inserting the collet 30 in the receiving bore hole 12 of the base element 10. This form locking connection provides a rotation safety of the collet 30 and of the base element 10 relative to one another at least about the longitudinal axis of the collet 30. In case the base element 10 has a centrally arranged receiving bore hole the substantially polyhedral shape of the collet 30 within the receiving bore hole 12 implements a rotation safety about the longitudinal axis and rotation axis R of the clamping system 1.

Based on the advantageous substantially polyhedral or polyhedral shape of the collet 30 which can also be generalized as a non circular shape, the collet has a cross section that is shaped as a triangle, a pentagon or a star in order to only recite a few selected embodiments. Based on the substantially polyhedral or polyhedral shape of the collet the catch elements 40 described infra in more detail which engage the provided recesses 20 can be omitted since based on the shape of the collet 30 a sufficient rotation safety between the base element 10 and the collet 30 is provided.

FIG. 13 illustrates the collet 30 with a preferably substantially polyhedral outer contour and a substantially polyhedral inner contour. The polyhedral or substantially polyhedral inner contour provides the second rotation safety between the collet 30 and the rotating tool 70 as described infra in more detail.

Figure 15:
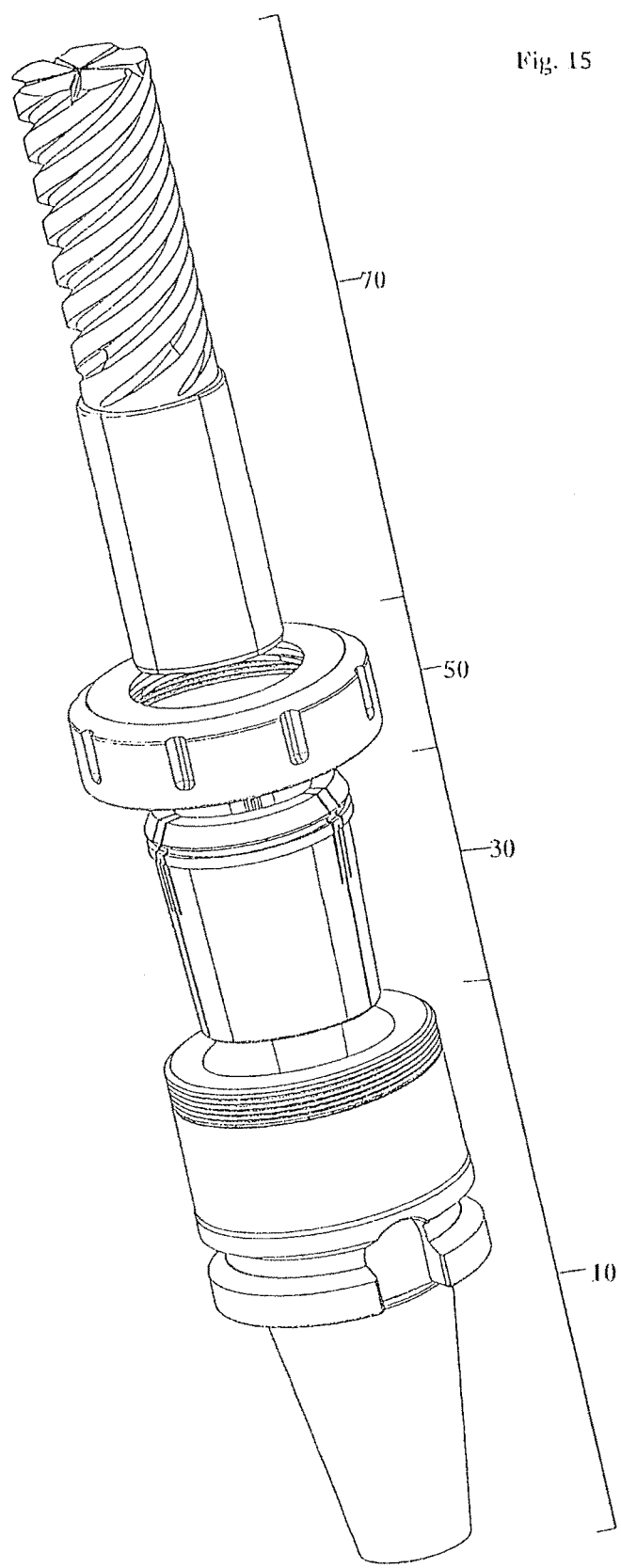
FIG. 15 illustrates a perspective exploded of another preferred embodiment of the clamping system according to the invention.

FIGS. 13 and 14 illustrate a perspective view and a partial sectional view of the base element 10 with a substantially polyhedral receiving bore hole 12. FIG. 15 accordingly illustrates a perspective exploded view of the clamping system 1 according to another advantageous embodiment with base element 10, collet 30, clamping nut 50 and rotating tool 70. The collet 30 with a substantially polyhedral inner contour and outer contour is insertable into the substantially polyhedral receiving bore hole of the base element 10. The tool shaft 74 of the rotating tool 70 is also shaped substantially polyhedral and is received secured against rotation by the substantially polyhedral tool receiving bore hole 32.

Figure 34:
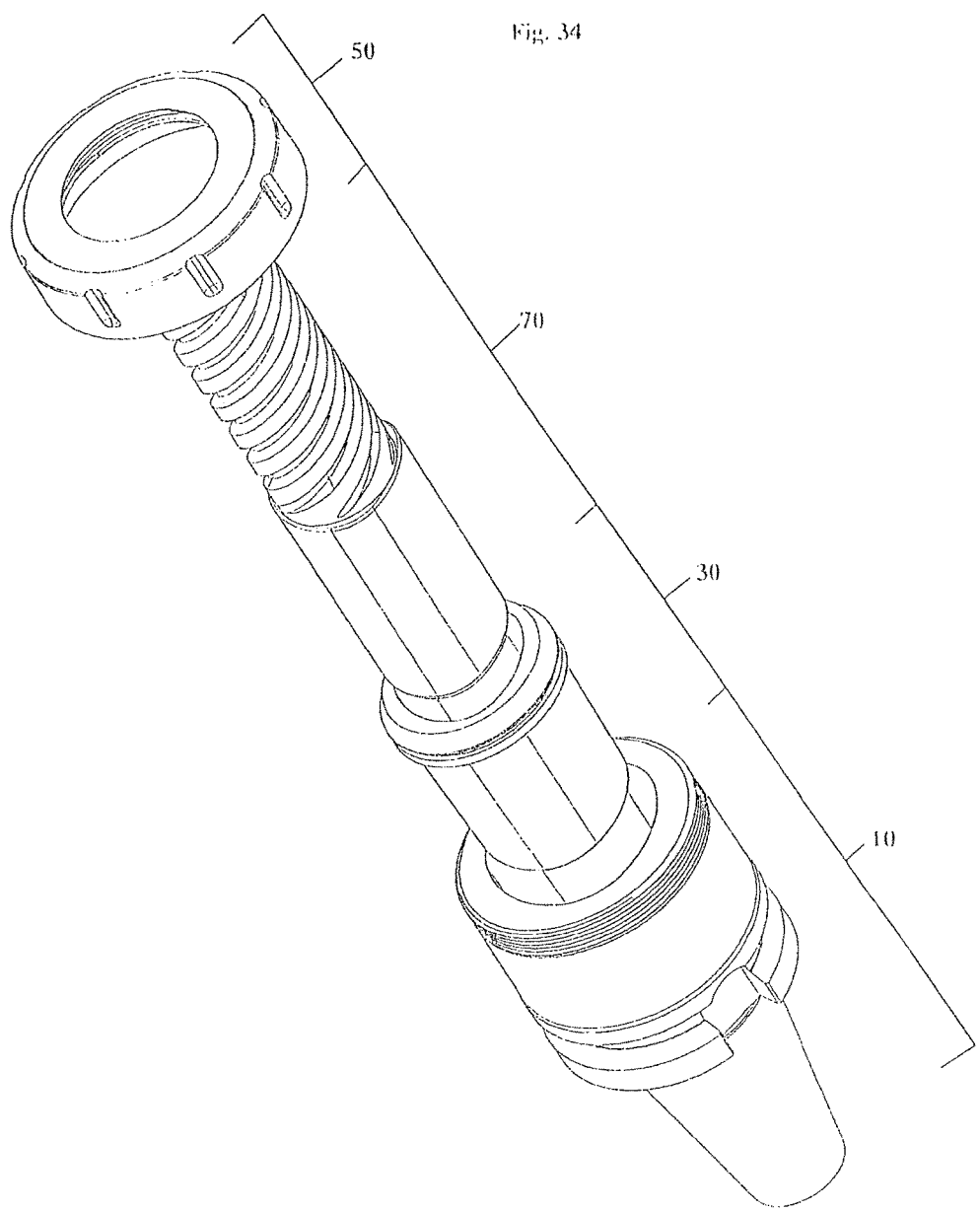
FIG. 34 illustrates a perspective exploded view of another preferred embodiment of the clamping system according to the invention with base element, collet and clamping nut in which the collet is configured as a shrink collet.

Another preferred embodiment of the clamping system 1 is illustrated in FIG. 34. In this embodiment the collet 30 is implemented as shrink collet. The rotating tool 70 is shrunk into the shrink collet 30 and forms a unit 70, 30 therewith. This unit 70, 30 including the shrink collet 30 and the rotating tool 70 is in turn received in the receiving bore hole 12 of the base element 10. The shrink connection between the rotating tool 70 and the shrink collet 30 can be secured by the rotation safety recited supra and/or an axial pull out safety as also described in other embodiments. Furthermore a rotation safety of this type and/or pull out safety can also be provided in the connection of this unit 70, 30 with the base element 10. The unit from shrink collet 30 and rotating tool 70 is secured in the base element 10 through the clamping nut 50.

Figure 16:
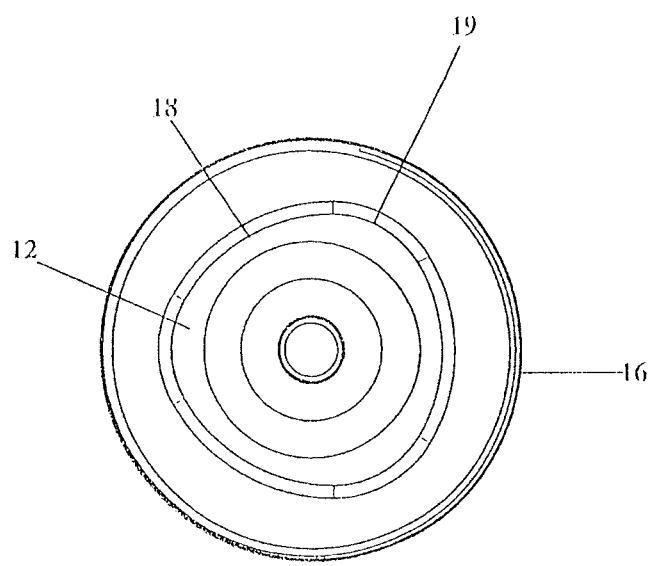
FIG. 16 illustrates a top view of a preferred embodiment of the base element with a substantially polyhedral receiving bore hole with collet.
Figure 17:
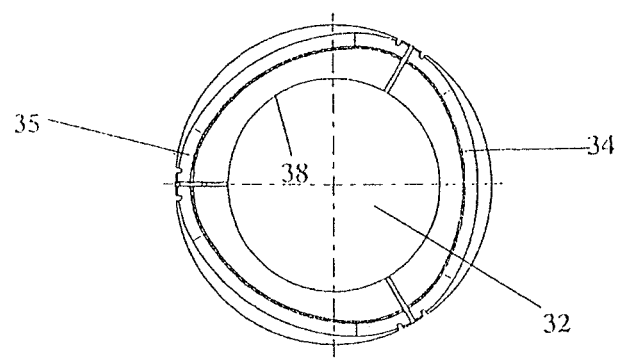
FIG. 17 illustrates a top view of a face of a preferred embodiment of the collet with the substantially polyhedral outer contour and the circular inner contour.
Figure 18:
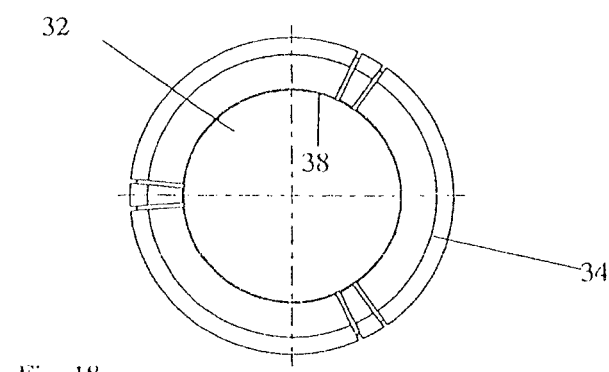
FIG. 18 illustrates a top view of a face of a preferred embodiment of a collet with a circular inner contour and a substantially polyhedral outer contour.
Figure 19:
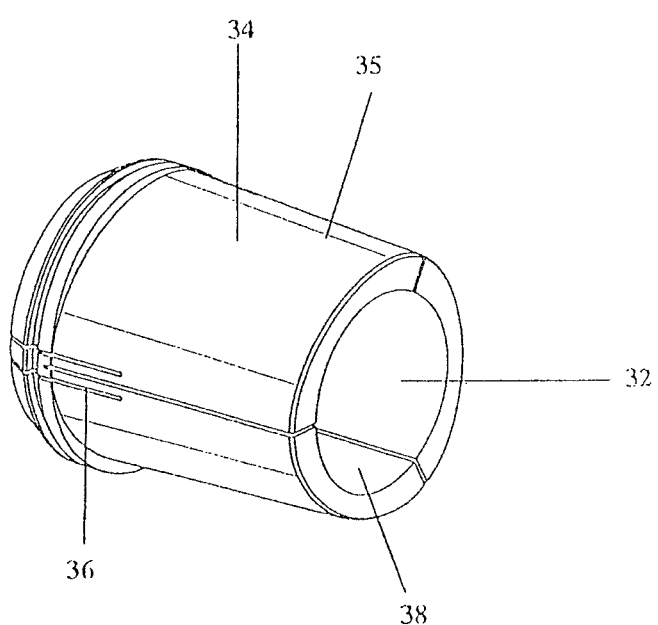
FIG. 19 illustrates a preferred embodiment of a collet with a circular inner contour and a substantially polyhedral outer contour.

FIG. 16 illustrates a top view of a face of the base element 10 into which a collet 30 with substantially polyhedral outer contour and circular inner contour of the tool receiving bore hole 32 is inserted. FIGS. 17 and 18 illustrate the faces of the collet 30 which has a substantially polyhedral outer contour and a circular inner contour. FIG. 19 illustrates a perspective view of the collet 30 from FIGS. 16-18. In analogy to the configurative features of the collet 30 the press collet (not illustrated) which is attached in the base element 10 without clamping nut 50 has the same configurative features as the collet 30.

Furthermore the collet 30 includes plural elongated slots 36 that are distributed in circumferential direction and essentially extend in axial direction, wherein the slots 36 at least partially penetrate the collet 30 in radial direction and are respectively provided at least in an axial section of the collet 30. The number of slots 36 and their width can be sized so that the clamping portion of the collet 30 is limited to a particular range. This way concentricity of the clamping system can be increased since among other things tilting errors of the collet 30 within the base element 10 are reduced. By the same token it is preferred in the present clamping system 1 to use the collet 30 without slots 36.

In order to prevent or block a rotation of the collet 30 in the base element 10 relative to the base element 10 through the clamping nut 50 as an alternative to the rotation safety described supra the clamping system 1 according to the invention includes another rotation safety. This rotation safety is implemented through form locking cooperation of configurative elements at the base element 10 and the collet 30. Form locking elements that interact in this manner are advantageously configured at radially contacting sides like for example the radially outer enveloping surface 34 and the inner enveloping surface 18 of the base element 10. It is furthermore preferred to provide form locking elements at opposite faces of the base element 10 and collet 30 which are arranged perpendicular to the rotation axis of the longitudinal axis R of the elements of the clamping system 1. In this case the form locking elements are configured substantially parallel to the rotation axis R.

Further preferably the rotation safety between base element 10 and collet 30 is implemented through at least one axially extending catch element 40 which engages a complementary recess 20 at the base element 10. Since the recess 20 for the engaging catch elements 40 forms an undercut in rotation direction about the rotation axis R a rotation of base element 10 and collet 30 relative to one another is locked and blocked.

While three catch elements 40 and three recesses 20 shaped corresponding thereto are advantageously provided the number of catch elements 40 and recesses 20 is variable.

Figure 3:
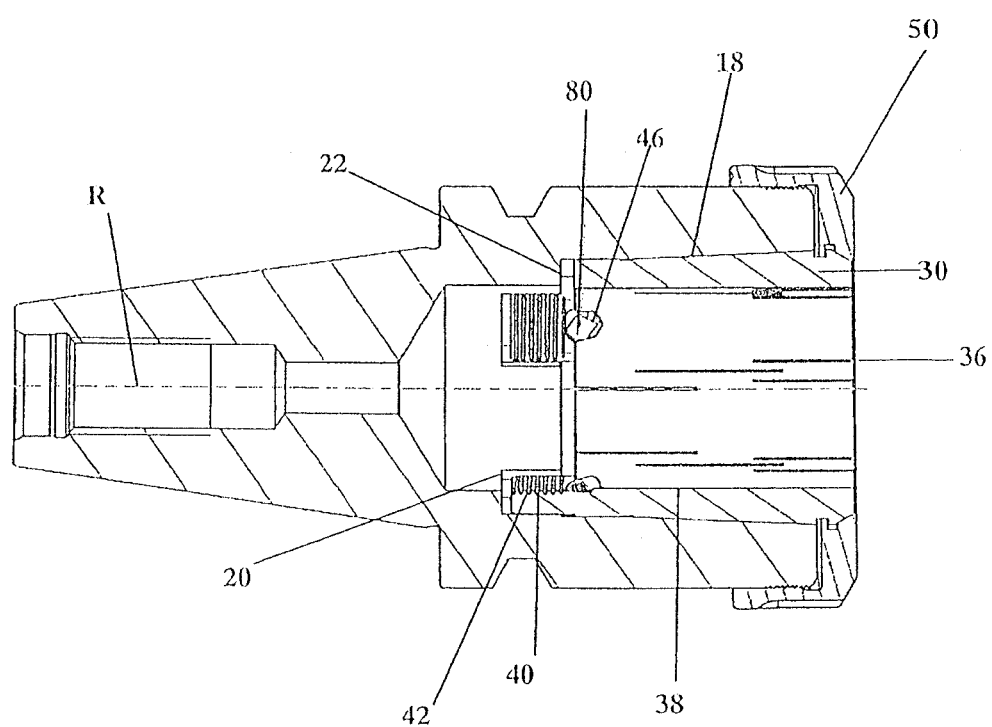
FIG. 3 illustrates a lateral schematic sectional view of the clamping system without the rotating tool of FIG. 2

With reference to the circumference of base element 10 and collet 30 and the distance to the rotation axis R the catch elements 40 and the recesses 20 are symmetrically and/or evenly arranged about the longitudinal axis R of the collet 30 in order to prevent for example an imbalance of the clamping system 1. According to the preferred embodiment of the clamping system 1 illustrated in FIGS. 3, 4, 5 the catch elements 20 are configured as axial engagement lugs. The engagement lugs 40 engage recesses 30 that are open in radially inward direction so that a radial inside of the advantageous flat engagement lugs 40 contacts the shaft 74 of the rotating tool 70. An exposed radial inside of the engagement lug 40 thus advantageously includes a profile 42 as apparent from FIGS. 3 and 5. This profile 42 is for example made from circumferentially extending grooves and protrusions which support the retention of the shaft 74 of the rotating tool in the collet 30. It is furthermore advantageous to form the catch elements 40 as pins or flat bars with a square or rounded shape.

In a kinematic reversal of the described form locking rotation safety between the base element 10 and the collet 30 it is also preferred to provide the catch elements 40 at the base element 10 and to provide the recess 20 at the collet 30. In the same way a mixed arrangement of the drive elements 40 and the recesses 20 at the base element and the collet 30 is conceivable. As another alternative of the form locking rotation safety an engaging teething at radially and/or axially opposite sides of base element 10 and collet 30 is implementable. For this purpose the enveloping surfaces 18 and 34 and the surfaces 22 and 44 of the base element 10 and the collet 30 are suitable. Advantageously the catch elements 40 and the associated recesses 20 are arranged symmetrically and evenly distributed about the rotation axis R. This additionally achieves a high level of concentricity and balancing when implementing the present invention which is not achievable in the prior art e.g. with conventional roller chucks. This concentricity and balance is also achievable with the same configurative embodiments for press collets without clamping nut.

Alternatively and/or as a supplement to the rotation safety described supra a rotation safety is provided through the cooperation of the clamping nut 50 with the collet 30. The clamping nut 50 is threaded through the thread 52 onto the outer thread 16 of the base element 10 in order to clamp the collet 30 within the receiving bore hole 12 of the base element 10 in this manner. After the collet 30 has been clamped within the base element 10 through the clamping nut 50 a form locking connection between the clamping nut 50 and the collet 30 is established. This form locking connection can be implemented for example through interlocking or blocking with a pin. Since the clamping nut 50 is attached through the threads 52, 16 at the base element 10 the form locking connection between the clamping nut 50 and the collet 30 provides a rotation safety between the collet 30 and the base element 10.

Figure 6:
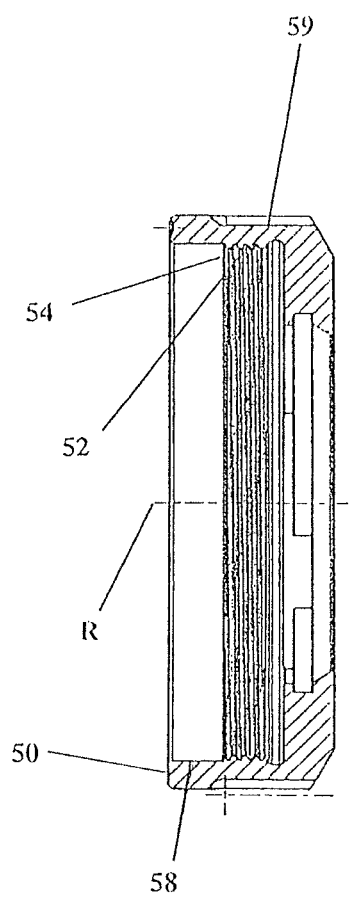
FIG. 6 illustrates a lateral sectional view of the clamping nut of FIG. 3.

During the installation of the rotating tool 70 in the clamping system 1 the collet 30 is initially arranged in the receiving bore hole 12 of the base element 10. Thus, the catch elements 40 engage the provided recess 20 and provide the rotation safety discussed supra without additional installation complexity. Subsequently the shaft 74 of the rotating tool 70 is inserted into the tool receiving bore hole 32 and the collet 30 is clamped with the clamping nut 50 or with another clamping method for press collets. It is also preferred to insert the collet 30 or the press collet with already installed rotating tools 70 into the base element 10 and then clamp it in the base element 10 through the clamping nut 50 or respective clamping methods. Preferably the clamping nut 50 illustrated in FIG. 6 is used for this purpose. Its inner thread 52 is thus threaded onto the outer thread 16 of the base element 10 in order to press the collet 30 with the rotating tool 70 into the base element 10. For this purpose the clamping nut 50 includes an outer drive device 51 like for example a hexagon.

According to FIG. 6 the clamping nut 50 includes a safety distance 58 between a start thread 54 of its inner thread 52 and an axial insertion end 58 of the clamping nut 50 oriented towards the base element 10. This safety distance 58 prevents an erroneous clamping of the collet 30 in the base element 10. Namely when a user accidently inserts the collet 30 into the base element 10 the wrong way, namely without establishing form locking between the catch element 40 and associated recesses 20 the collet 30 does not penetrate deep enough into the receiving bore hole 12 of the base element 10 and protrudes at the tool side end of the base element 10. Due to the safety distance 58 and the axial protrusion of the collet 30 the inner thread 52 of the clamping nut 50 is too far away from the outer thread 12 at the base element 10 to be connected therewith. Thus, faulty clamping of the collet 30 is prevented in this situation. Only when the user inserts the collet 30 correctly into the base element 10 the safety distance 58 of the clamping nut 50 can be bridged so that the inner thread 52 of the clamping nut 50 and the associated outer thread 16 at the base element 10 engage one another so that the collet 30 can be clamped in the base element 10.

Figure 20:
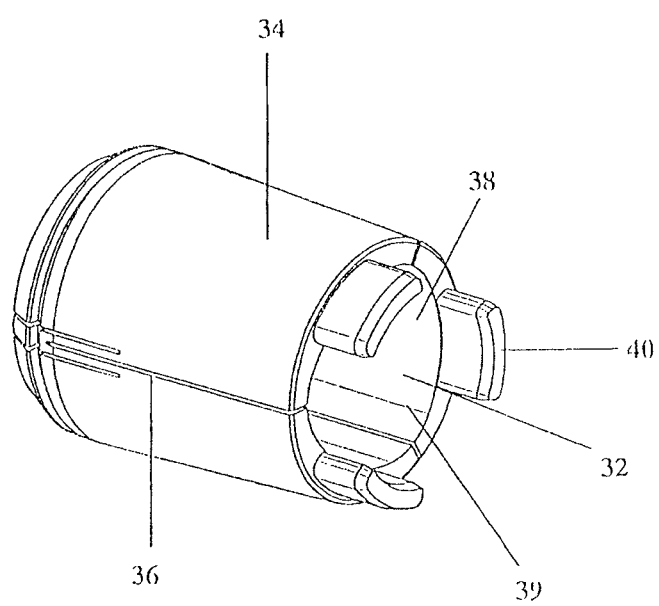
FIG. 20 illustrates a perspective view of a preferred embodiment of a collet with a circular outer contour and a substantially polyhedral inner contour and axially protruding catch elements.
Figure 21:
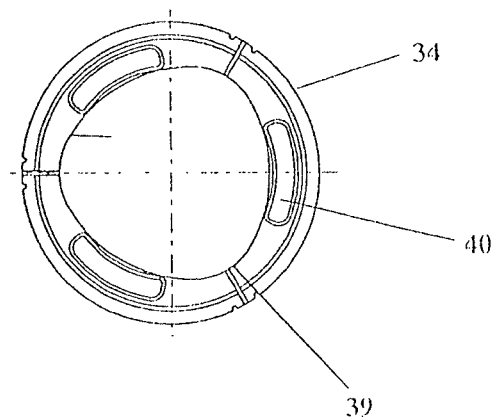
FIG. 21 illustrates a top view of the face with catch elements of the collet of FIG. 20.
Figure 22:
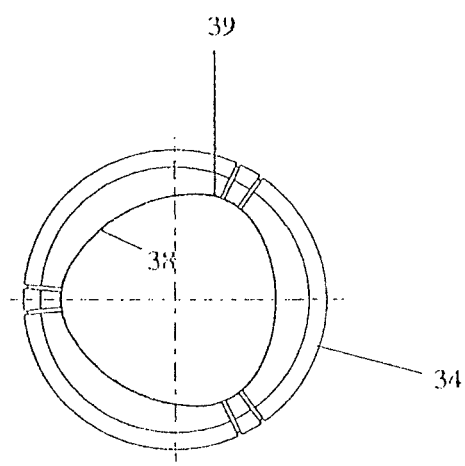
FIG. 22 illustrates a top view of the face without catch element of the collet of FIG. 20.

According to another preferred embodiment of the present invention the clamping system 1 includes a rotation safety which blocks a rotation to the rotating tool 70 relative to the collet 30. For this purpose the tool receiving bore hole 32 of the collet 30 includes a non circular substantially polyhedral or polyhedral radial contour as illustrated in FIGS. 12 and 15 and described with corresponding language. In order to implement the rotation safety the outer shape of the tool shaft 74 of the rotating tool 70 is complementary to the inner shape of the tool receiving bore hole 32 of the collet 30 (c.f. FIG. 15). Consequently any non circular contour of the cross section of the tool receiving bore hole 32 of the collet 30 with a shape adapted tool shaft 74 of the rotating tool 70 blocks a rotation of the collet 30 and the rotating tool 70 relative to one another about the longitudinal axis about the rotating tool 70. As a consequence the preferably substantially polyhedral edges 39 in the tool receiving bore hole 32 fit respective substantially polyhedral edges 75 of the tool shaft 74 of the rotating tool 70 and cooperate therewith. It is appreciated that the non circular or substantially polyhedral or polyhedral radial inner contour of the tool receiving bore hole 32 can be a triangle, a square, a hexagon, a star or a contour with rounded edges to provide such rotation safety. For further visualization FIG. 20 illustrates a preferred embodiment of the collet 30 with substantially polyhedral inner contour and axial catch elements as described supra. FIGS. 21 and 22 illustrate a top view of the faces of the collet 30 of FIG. 20.

Figure 23:
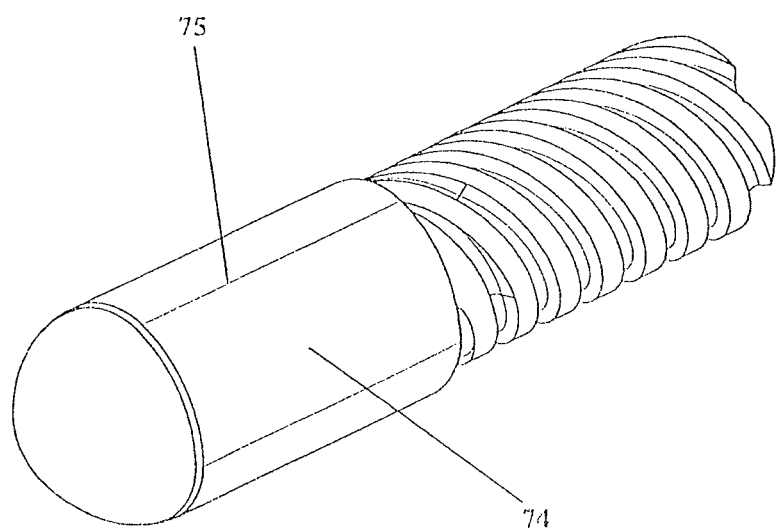
FIG. 23 illustrates a perspective view of a preferred cutter with a substantially polyhedral tool shaft.
Figure 24:
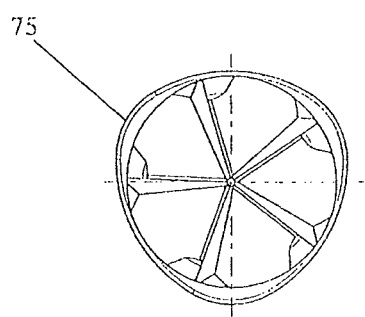
FIG. 24 illustrates a top view of the tool tip of the cutter of FIG. 23.
Figure 25:
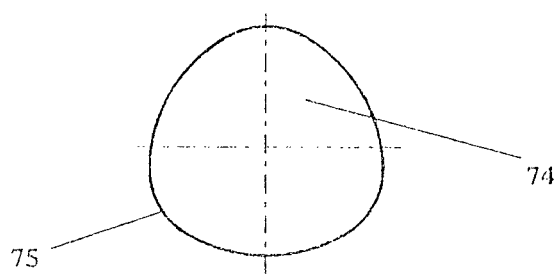
FIG. 25 illustrates a top view of the substantially polyhedral tool shaft of the cutter of FIG. 23.
Figure 26:
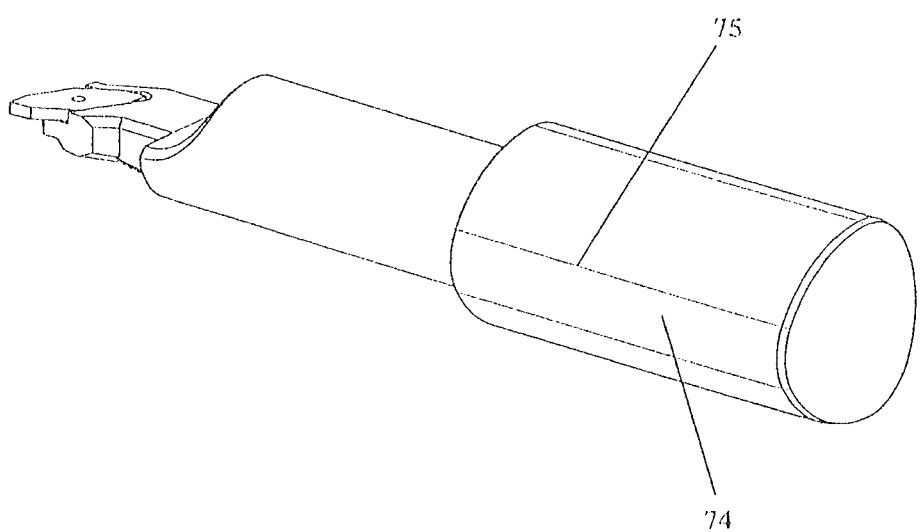
FIG. 26 illustrates a perspective view of an advantageous turning steel with a substantially polyhedral tool shaft.
Figure 27:
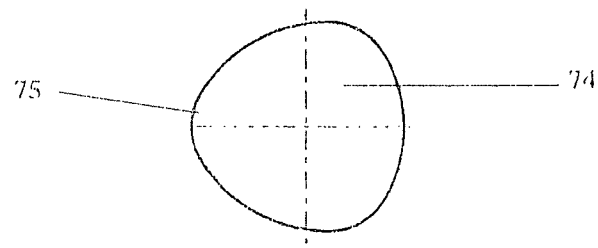
FIG. 27 illustrates a top view of the face of the substantially polyhedral tool shaft of the turning steel of FIG. 26.

Complementary to the substantially polyhedral inner contour of the collet 30 of FIGS. 12, 15, and 20 which can also advantageously have polyhedral shape the tool shaft 74 of the rotating tool 70 includes a complementary substantially polyhedral outer contour. It is also advantageous to form the tool shaft 74 polyhedral or generally non circular. In an exemplary manner FIG. 23 illustrates a cutter configured as a rotating tool 70 with a substantially polyhedral tool shaft 74. A respective top view of the face of the cutter tip is illustrated in FIG. 24 whereas FIG. 25 illustrates the face of the substantially polyhedral tool shaft 74. FIG. 26 illustrates a turning steel with a substantially polyhedral tool shaft 74, whereas FIG. 26 illustrates the face of the substantially polyhedral tool shaft 74 of the turning steel of FIG. 26. The clamping system 1 in the exploded view of FIG. 15 illustrates in an exemplary manner using various components rotating tool 70, base element 10 and collet 30 in combination with the clamping nut 50. The rotation safety between the base element 10 and the collet 30 is established through the advantageous substantially polyhedral outer contour of the collet 30 in combination with the substantially polyhedral inner contour of the receiving bore hole 12 of the base element 10. Furthermore another rotation safety between the rotating tool 70 in particular between the tool shaft 74 and the inner surface of the collet 30 is implemented. Thus, the substantially polyhedral surfaces and rounded edges of the tool shaft 74 cooperate with respective surfaces and edges of the radially inner enveloping surface of the collet 30. While the clamping nut 50 clamps the collet 30 with the rotating tool 70 in the base element 10 the clamping system illustrated in FIG. 15 is implementable in the same manner with a press collet. In this case a press collet with a substantially polyhedral inner and outer contour is clamped in the receiving bore hole 12 of the base element 10 without a clamping nut 50, for example shrink fitted. The preferred embodiments of the collet illustrated in FIGS. 12, 17, 18 and 19 and the embodiments of the base element in FIGS. 13 and 14 and furthermore the preferred embodiments of the rotating tool 70 in FIGS. 23, 24, a25 and 27 are equally useable in the clamping system 1 of the FIG. 15.

The substantially polyhedral shapes described supra are advantageously also configured polyhedral or generally non circular.

According to another preferred embodiment according to the present invention the collet 30 includes a pull out safety for a rotating tool 70 for the collet 30. Form locking pull out safeties are described in EP 2 004 351 B1 which are referred to regarding a detailed description of the configurative properties of pull out safeties of this type.

Figure 7:
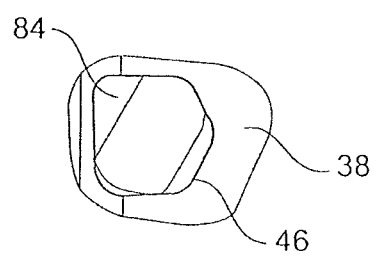
FIG. 7 illustrates a perspective view of a preferred embodiment of a catch member, in particular a slider.
Figure 8A:
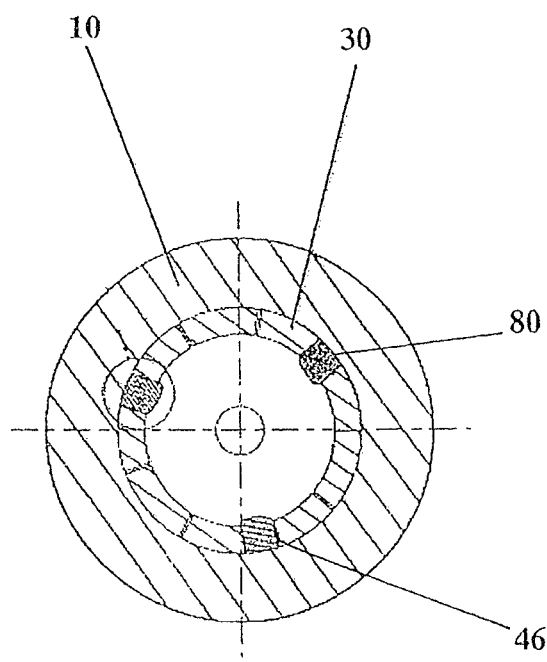
FIG. 8a illustrates a schematic sectional view of a preferred embodiment of base element and collet with sliders along a sectional plane perpendicular to a rotation axis of the advantageous clamping system according to the invention.
Figure 9:
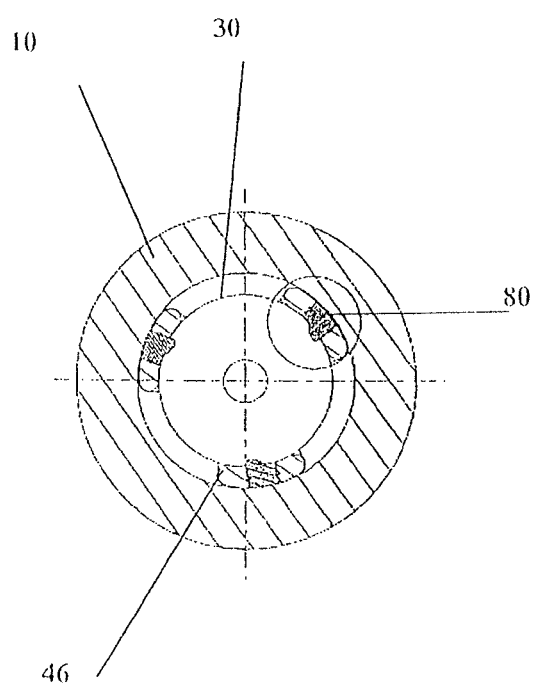
FIG. 9 illustrates a schematic sectional view of another preferred embodiment of base element and collet with groove sides along a sectional plane perpendicular to the rotation axis of the preferred clamping system according to the invention.
Figure 10:
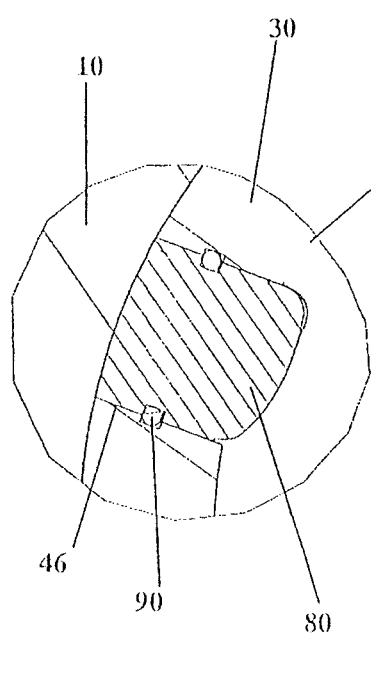
FIG. 10 illustrates a schematic sectional view of a preferred arrangement of a slider in the collet.
Figure 11:
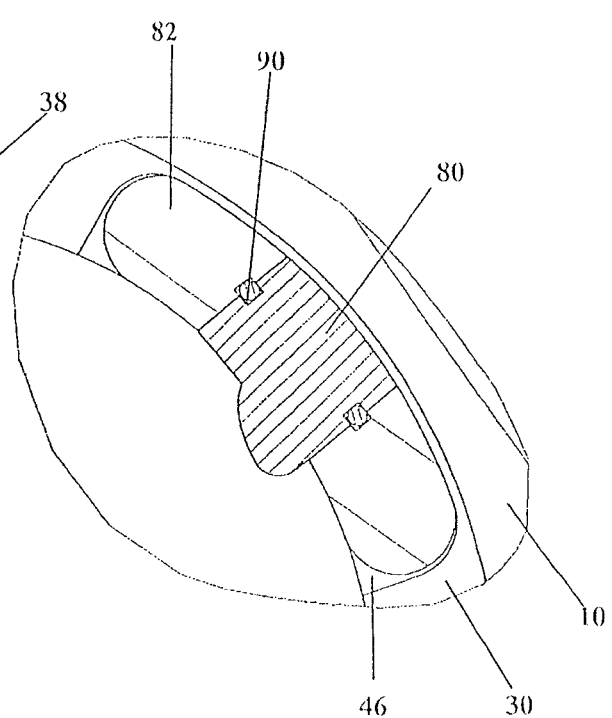
FIG. 11 illustrates a blown up view of an encircled portion of a preferred embodiment of a slider in the collet according to FIG. 9.

In order to implement the pull out safety at least one recess or pass through opening 46 is configured at the radially inner enveloping surface 38. A catch member 80 is fitted in the at least one recess or pass through opening 46, preferably a type of slider (c.f. FIG. 7). The catch member 80 is fixated in this recess or pass through opening 46 through a support element 90. Preferably an O-ring, a retaining ring, a spring elastic ring 90 or a glue joint (not illustrated) is used for attaching the catch member 80 in the recess or pass through opening 46. This is illustrated in FIGS. 8a, 9 through 11. The catch members 80 are arranged evenly distributed in circumferential direction of the collet 30, wherein FIGS. 8a, and 10 show an arrangement in pass through openings 46 and FIGS. 9 and 11 show an arrangement of the sliders or catch members 80 in the recesses.

The catch member is configured to that it protrudes at least partially into the centric tool receiving bore hole 32 of the collet 30. After inserting the rotating tool 70 into the collet 30 the catch member 80 engages at least one locking groove at the shaft 74 of the rotating tool 70. This way a form locking connection between the locking groove 72 and the engaging catch member 80 is provided. The at least one locking groove 72 is preferably arranged like a thread at the cylindrical tool shaft 74 starting at a face of the cylindrical shaft 74 and along the enveloping surface of the cylindrical shaft 74. The locking groove 72 arranged on the enveloping surface of the cylinder shaft 74 of the rotating tool 70 have a left pitch for left hand rotating tools 70 and a right pitch for right hand rotating tools 70.

Thus the at least one locking groove 72 can also be axially configured or with an axial partial component and thus entirely or partially parallel to the rotation axis R wherein the locking groove 72 still operates as a rotation safety for the tool 70 within the clamping system 1. In this context the locking grooves 72 at the tool shaft 74 are configured screw shaped, helical, curved or as a bayonet groove and can thus also include axial and/or straight sections.

Figure 8B:
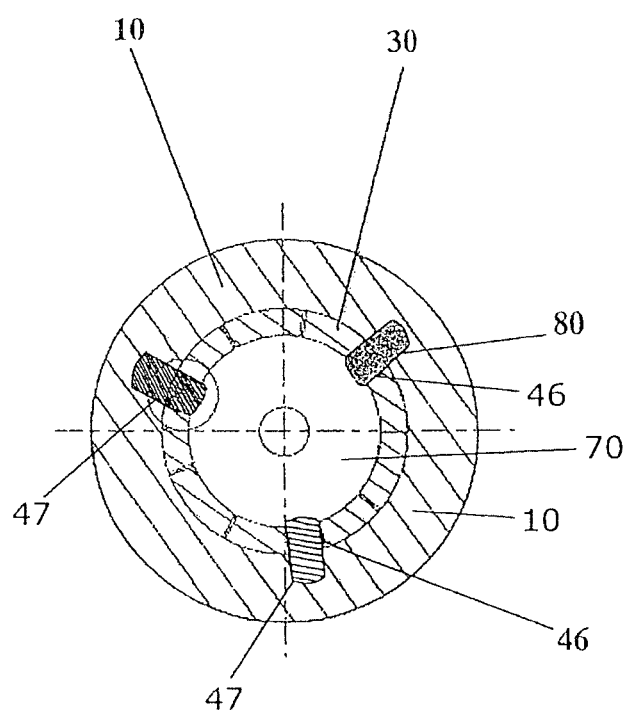
FIG. 8b illustrates a sectional view of a modified embodiment according to FIG. 8a, wherein a rotation safety between collet and base element is implemented.

The embodiment illustrated in FIG. 8b represents a variation of the embodiment illustrated in FIG. 8a. Thus the sliders or catch members 80 which are received in the collet 30 engage the shaft of the tool 70 received in the collet as it is the case in FIG. 8a. Additionally the sliders 80 also engage recesses 74 in the base element 10 so that they act by the same token as rotation safety between the collet 30 and the base element 10. Thus in this embodiment the sliders can form the first and also the second rotation safety but also a pull out safety for the tool shaft. in the illustrated embodiment thus three sliders 80 are provided distributed over a circumference which sliders are received in pass through openings 46 of the collet. As a matter of principle already only one slider can be used as rotation safety, however plural sliders are advantageous, wherein the number of the sliders is not at all limited to the number three as illustrated only in an exemplary manner in FIGS. 8a and 8b.

FIG. 7 illustrates the slider 80 which is preferably used in the collet 30 as a catch member 80. The slider 80 includes a base plate 84 with a special outer contour. The circumferential shape of the receiving recess or pass through opening 46 is adapted to the outer contour of the base plate 84 so that the slider is advantageously only arrangeable in one positional orientation in the recess 46. The recess or pass through opening 46 forms a form locking and fitting connection with the base plate 84 of the slider 80 for this purpose. A predetermined symmetry of recess/pass through opening 46 and base plate 84 prevents a false orientation of the slider 80.

With respect to the catch members 80 it is additionally advantageously to arrange these in the recesses or pass through opening 46 in a replaceable and thus retrofitable manner.

Figure 28:
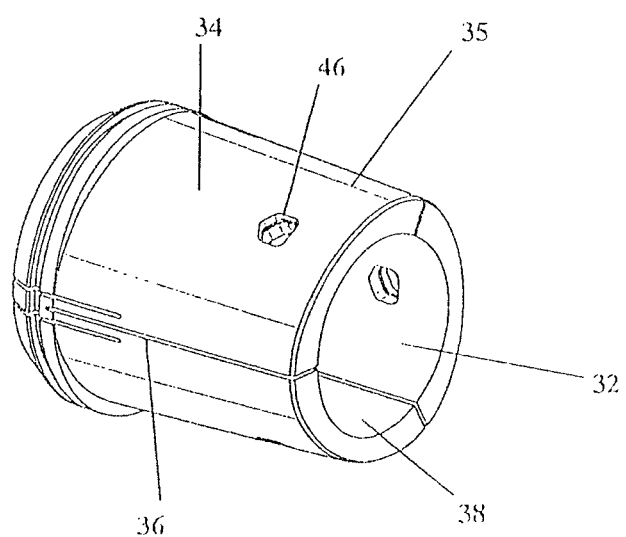
FIG. 28 illustrates a perspective view of an advantageous collet with a substantially polyhedral outer contour and recesses for catch members.

Furthermore FIG. 28 illustrates a collet 30 with a substantially polyhedral outer contour and circular inner contour in which the catch members 80 described supra are insertable in openings 46 provided for this purpose.

It is feasible that the tool shaft 74 of the rotating tool 70 to be inserted into the tool receiving bore hole 32 is configured thin enough so that it cannot be clamped in the tool receiving bore hole 32. In order to still be able to use the rotating tool 70 a reducer sleeve 60 is inserted as a compensation and intermediary element between the tool shaft 74 and the collet 30. An exemplary embodiment of a clamping system with the reducer sleeve 60 is illustrated in FIG. 33.

Figure 33:
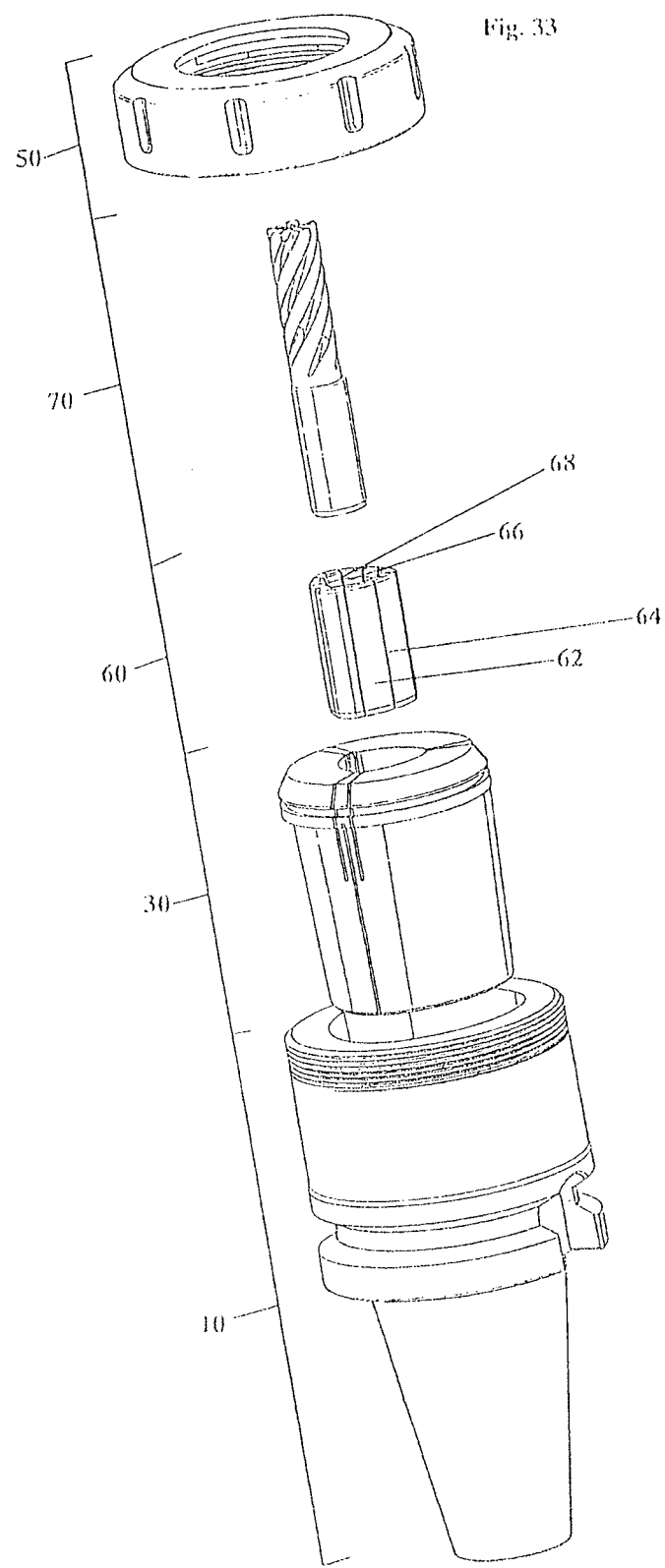
FIG. 33 illustrates a schematic perspective exploded view of a clamping system that is similar to the advantageous clamping system of FIG. 15 according to the invention including an advantageous reduction sleeve between the rotating tool and the collet.

The clamping system 1 of FIG. 33 uses the base element 10 with a receiving bore hole 12 which has a substantially polyhedral contour. In adaptation thereto the collet 30 has a substantially polyhedral radial outer enveloping surface 34 so that a rotation safety between the collet 30 and the base element 10 about the longitudinal axis is provided. In order to provide additional rotation safety between the rotating tool 70 and the collet 30 the tool receiving bore hole 32 of the collet 30 and the tool shaft 74 are configured in a substantially polyhedral shape. Since the substantially polyhedral tool shaft 74 is configured too small it cannot be clamped into the tool receiving bore hole 32 of the collet 30. The intermediary space between the tool shaft 74 and the interior radially enveloping surface 38 of the collet 30 is compensated by the reduction sleeve 60. The reduction sleeve 60 is configured in its radially outer sleeve shape 62 preferably complementary to the radially inner enveloping surface of the collet 30. Therefore the edges 64 and surfaces of the substantially polyhedral or polyhedral radially outer sleeve shape 62 cooperate with the edges 39 and surfaces of the radially inner enveloping surface 38. In the same way the radially inner sleeve shape 66 of the reducer sleeve 60 is adapted to the substantially polyhedral shape of the tool shaft 74. Therefore the substantially polyhedral or polyhedral edges 75 and surfaces of the tool shaft 74 interact with edges 68 and surfaces of the polyhedral or substantially polyhedral radially inner sleeve shape 66. These surfaces of rotating tool 70 reducer sleeve 60, collet 30 and base element 10 with shapes adapted to one another generate the rotation safeties which provide the integrity of the clamping system 1 for example with heavy duty chipping operations. Though the clamping system 1 of FIG. 33 is clamped with the clamping nut it is advantageous by the same token to use a press collet without clamping nut 50 in combination with the illustrated rotating tool 70, the reducer sleeve 60 and the base element 10.

Figure 29:
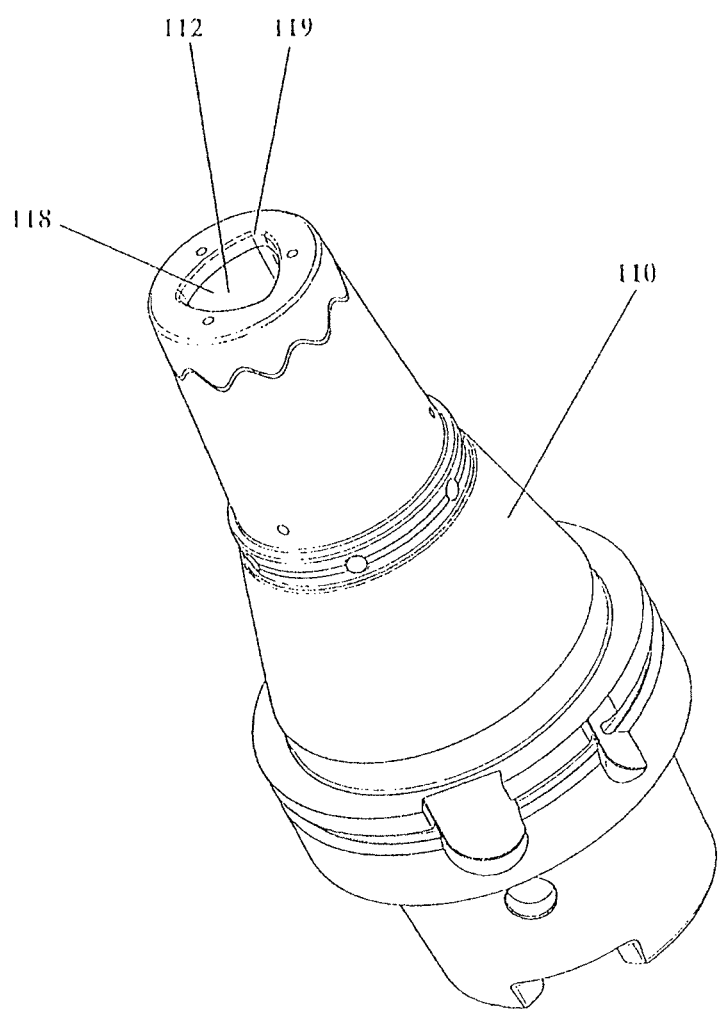
FIG. 29 illustrates an advantageous embodiment of the additional clamping system according to the invention without collet, illustrated without rotating tool.
Figure 30:
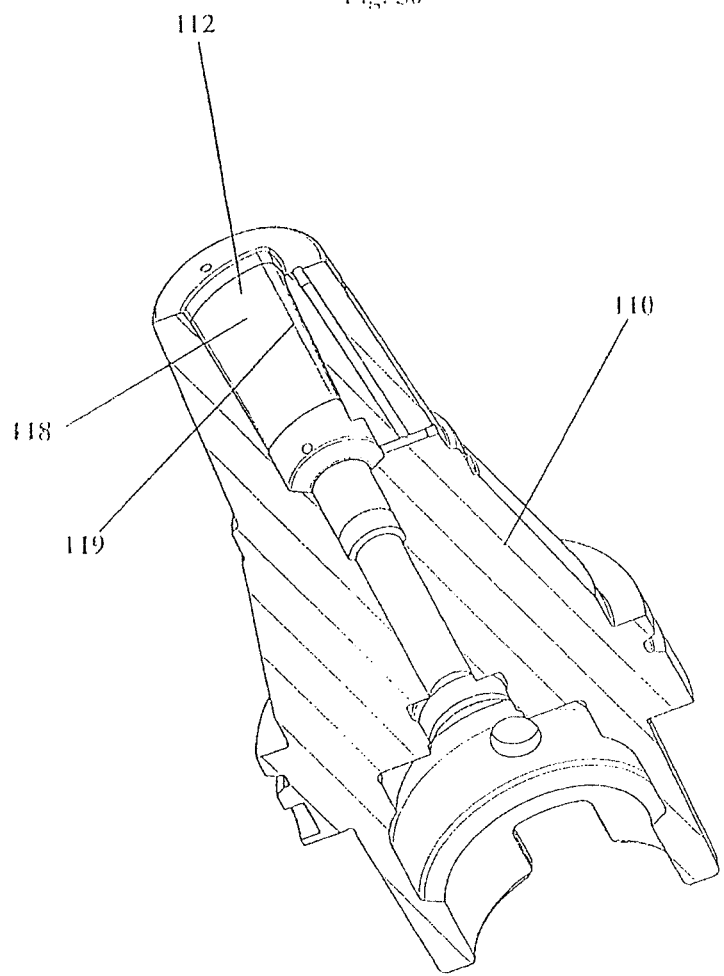
FIG. 30 illustrates a perspective sectional view of the advantageous base element of the second clamping system according to the invention without collet, thus with a direct arrangement of the rotating tool in the receiving bore hole of the base element.
Figure 31:
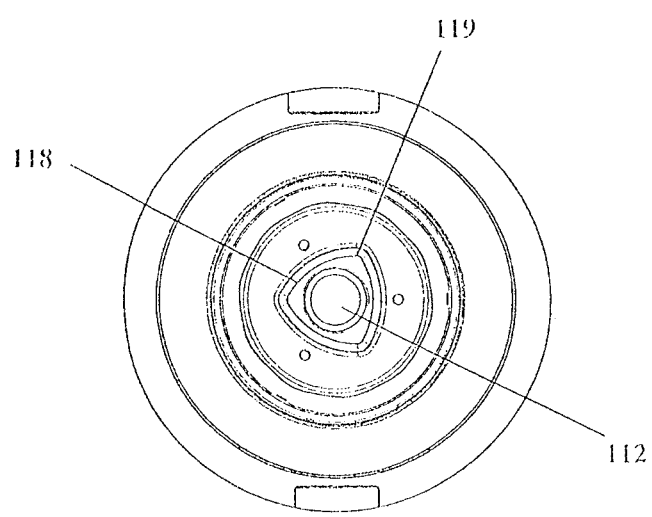
FIG. 31 illustrates a top view of the face with receiving bore hole of the base element of FIG. 30.
Figure 32:
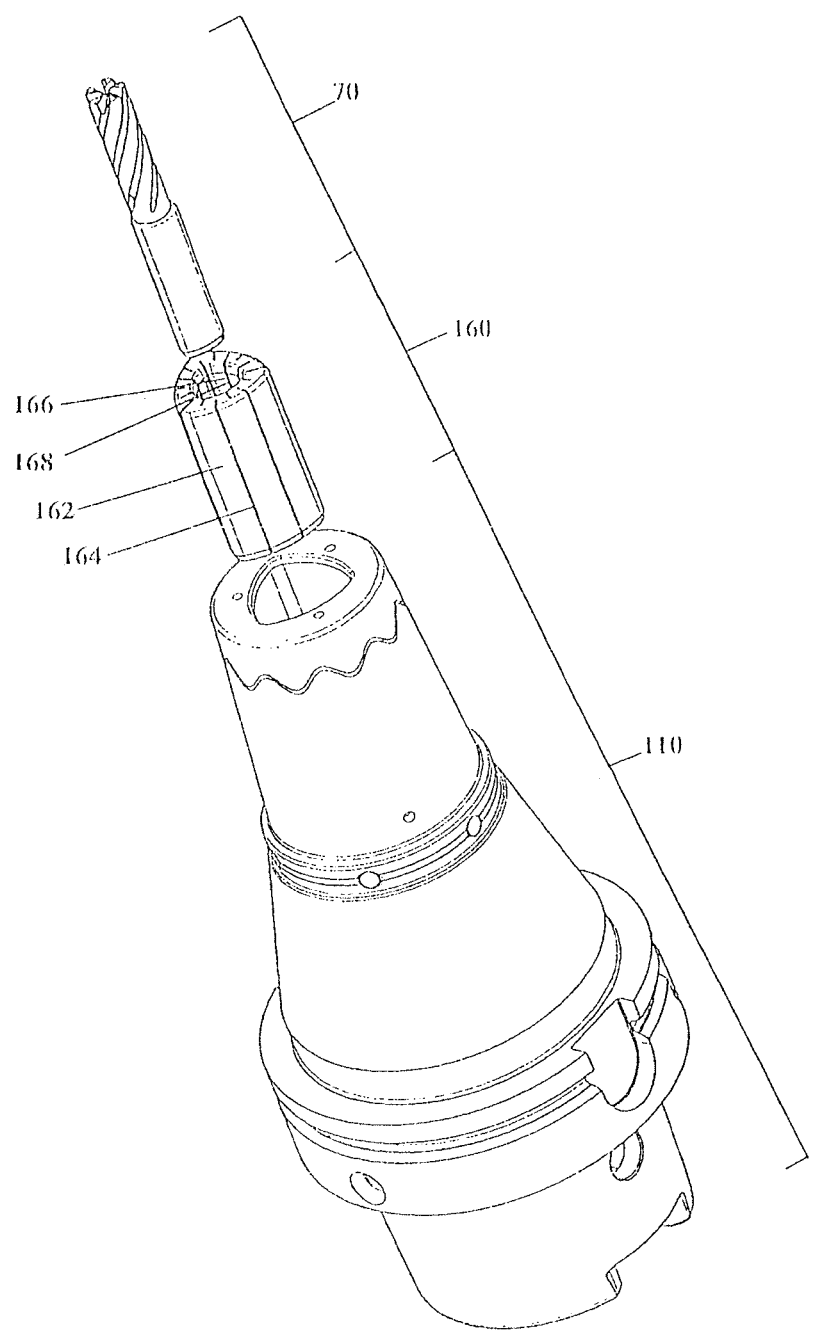
FIG. 32 illustrates a perspective schematic exploded view of another advantageous clamping system without collet with base element reduction sleeve and rotating tool.

The present invention furthermore provides a clamping system 3 for rotating tools 70 as illustrated according to preferred embodiments in FIGS. 29, 30, 31 and 32. The clamping system 3 includes a base element 110 in which the rotating tool 70 is attachable directly without using a collet 30. The base element 110 of the clamping system 3 also includes a receiving bore hole 112 as illustrated in FIGS. 29-31. Clamping systems 3 of this type which attach the rotating tool 70 without using a collet 30 are generally known in the art. Clamping systems 3 of this type include for example hydro expansion chucks or shrink fit chucks as described in EP 2 0004 351 B1. In case of a shrink fit chuck the base element 110 is heated in the portion of the receiving bore hole 112 so that the material of the base element 110 expands in this portion. Consequently the diameter of the receiving bore hole 112 of the base element 110 expands as well so that the tool shaft 74 of the rotating tool 70 is insertable into the receiving bore hole 112. Since a diameter of the receiving bore hole 112 of the base element 110 in cooled down condition of the base element 10 has a smaller cross section than the cross section of the tools shaft 74 of the rotating tool 70. The rotating tool 70 is supported through a friction locking connection within the receiving bore hole 112 within the base element 110 after cooling.

When using friction clamping systems 3 according to the prior art it can occur that the rotating tool is rotated relative to the base element 10 through a high torque that occurs during chipping. In order to block this relative rotation between base element 110 and rotating tool 70 the receiving bore hole 112 of the base element 110 has a non circular outer contour. An outer shape of the tool shaft 74 of the rotating tool 70 is in turn adapted it to the cross sectional shape of the receiving bore hole 112 so that the rotating tool 70 after insertion into the receiving bore hole 112 of the base element 110 forms a form locking connection with the base element 110. This means that a relative rotation between the base element 110 and the rotating tool 70 is blocked.

According to a preferred embodiment of this clamping system 3 according to the invention without collet as illustrated in FIGS. 29-32 the receiving bore hole 112 of the base element 110 has a polyhedral or substantially polyhedral shape. the edges within the polyhedral or substantially polyhedral shape of the receiving bore hole 112 are designated with the numeral 119. Compared to the clamping system 1 described supra the configurative properties and configurations of the tool receiving bore holes 32 of the collet 30 as described supra are advantageously transferred in the clamping system 3 to the receiving bore hole 112 of the base element 110 of the FIGS. 29 through 32.

Based on the complementary shape of tool shaft 74 and receiving bore hole 112 a rotation safety is provided which blocks in addition to the friction locking or form locking connection between the base element 110 and the tool shaft 74 of the rotating tool 70 a relative rotation of the tool shaft 74 within the base element 110 about its longitudinal axis and/or the longitudinal axis of the rotating tool 70. Thus also this rotation safety supports stability and firm connection of the clamping system 3 so that for example integrity of the clamping system 3 is provided during heavy duty chipping operations. Preferably the receiving bore hole 112 in the base element 110 is arranged concentric with the rotation axis or longitudinal axis R of the base element. However there are also other applications for the invention in which the receiving bore hole 112 is eccentrically provided in the base element 110.

FIGS. 30 and 31 respectively illustrate a preferred embodiment of the clamping system 3 in which the rotating tool 70, (not illustrated) is receivable directly, this means without collet in the receiving bore hole of the base element 110 with a rotation safety about the longitudinal axis if the base element 110. According to the preferred embodiment of FIGS. 30 and 31 the receiving bore hole 112 has a substantially polyhedral shape with 3 rounded edges 19. It is equally advantageous to implement this substantially polyhedral shape with more than three rounded edges or as a polyhedral shape with sharp edges or as a mix of these configurative elements as long as the configurative elements block a relative rotation between the base element 10 and the inserted rotating tool 70.

In order to further configure the tool shaft 74 and the receiving bore hole 112 of the base element 110 reference is made to the description of the clamping system 1 described supra which applies equally to the clamping system 3.

With reference to FIG. 33 the configuration and function of the reducer sleeve 60 was described supra. As evident in FIG. 32 from the exploded view of the clamping system 3 also herein rotating tools 70 can be advantageously used, whose tool shaft 74 has a diameter that is too small compared to the receiving bore hole 112 of the base element 110. Thus the rotating tool 70 by itself is not clampable in the receiving bore hole 112 of the base element 110. In order to compensate these size differences between the tool shaft 74 of the rotating tool 70 and the size of the receiving bore hole 112 of the base element 110 a reducer sleeve 160 is also used in the clamping system 3 in FIG. 32. The reducer sleeve 160 preferably ahs the same configurative elements as the reducer sleeve 60 of FIG. 33 (c.f. supra). as an adaptation to the shape of the inner enveloping surface 118 of the receiving bore hole 112 of the base element 110 the reducer sleeve 160 preferably includes a radially outer sleeve shape 162 that is complementary to the inner enveloping surface 118. According to various advantageous embodiments the radially outer sleeve shape 162 is configured polyhedral or substantially polyhedral with respective edges 164. As an adaptation to the outer shape of the tool shaft 74 of the rotating tool 70 the reducer sleeve 160 has a radially inner sleeve shape 166. Should a polyhedral or substantially polyhedral tool shaft 74 be used the radially inner sleeve shape 166 is advantageously complementary to the tool shaft 74 and thus also configured polyhedral or substantially polyhedral. Thus the radially inner sleeve shape 166 has for example polyhedral or substantially polyhedral edges 168.

In order to install the clamping system 3 the rotating tool 70 is directly inserted into the receiving bore hole 112 of the base element 110 and clamped or the rotating tool 70 is used in combination with the reducer sleeve 160 in the receiving bore hole 112 and then clamped in the same manner as the installation of the clamping system 1 is performed. Through inserting the rotating tool 70 with or without reducer sleeve in the receiving bore hole 112 of the base element 110 the rotation safety between rotating tool 70 and base element 110 is automatically implemented since the surfaces of rotating tool 70, reducer sleeve 160 and base element 110 that are configured complementary to one another are supported at one another. The same applies for the installation method of the clamping system according to FIG. 33 in that the surfaces of rotating tool 70, reducer sleeve 60, clamping collet 30 and base element are supported at one another in order to block a rotation of the individual components relative to one another.

REFERENCE NUMERALS AND DESIGNATIONS 1 clamping system
10; 110 base element
12; 112 receiving bore hole
14 tool side face
16 thread
18; 118 inner enveloping surface
19; 119 substantially polyhedral or polyhedral edge
20 recess
22 surfaces
30 collet
32 tool receiving bore hole
34 radially outer enveloping surface
35 substantially polyhedral or polyhedral edge
36 axial slots
38 radially inner enveloping surface
39 substantially polyhedral or polyhedral edge
40 catch element, engagement lug
42 radially inner profile
44 profile surface
46 recess or pass through opening
50 clamping nut
52 inner thread
54 thread start of inner thread
56 contact end
58 safety distance
60; 160 reducer sleeve
62; 163 radially outer sleeve shape
64; 164 edges of substantially polyhedral or polyhedral radially outer sleeve shape
66; 166 radially inner sleeve shape
68; 168 edges of polyhedral or substantially polyhedral radially inner sleeve shape
70 rotating tool
72 locking groove
74 tool shaft
75 substantially polyhedral or polyhedral edge
80 catch member, slider
84 base plate
90 support element

The invention claimed is:

1. A clamping system (1) for rotating tool (70) with a shaft (74), comprising:
   a. a base element (10), comprising a chuck for turning, milling or other rotating machines and similar with a receiving bore hole (12);
   b. a collet (30) with a tool bore hole (32) for the rotating tool (70), wherein the collet (30) is removably arranged in the receiving bore hole (12) of the base element (10) and is preloadable with friction locking relative to the base element (10) for providing rotational fixation wherein a clamping nut (50) axially forces the collet (30) into the receiving bore hole (12) of the base element (10); and
   c. a first rotation safety which blocks a rotation of the collet (30) relative to the base element (10) wherein the first rotation safety is provided by at least two catch elements (40) provided on the collet (30) in a distance to a longitudinal axis (R), wherein the catch elements engage recesses (20) on the base element (10) that are shaped complementary to the catch elements (40) in order to form a form locking connection and wherein the catch elements (40) are advantageously configured as a plug in components in form of engagement lugs that engage recesses (20) that are open in the radially inward direction so that a radial inside of the engagement lugs is configured for contacting the shaft (74) of the rotating tool (70).

2. The clamping system (1) according to claim 1, further comprising: three catch elements (40) arranged symmetrically about the longitudinal axis R of the receiving bore hole (12).

3. The clamping system (1) according to claim 2, wherein the collet (30) includes the catch elements (40) at a face oriented towards the base element (10) that extend parallel to the longitudinal axis R, wherein the catch elements engage correspondingly shaped recesses (20) in the base element (10).

4. A collet for a clamping system according to claim 1.

* * * * *